(12) United States Patent
Hoffmeister

(10) Patent No.: US 10,388,274 B1
(45) Date of Patent: Aug. 20, 2019

(54) CONFIDENCE CHECKING FOR SPEECH PROCESSING AND QUERY ANSWERING

(71) Applicant: Amazon Technologies, Inc., Seattle, WA (US)

(72) Inventor: Björn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 618 days.

(21) Appl. No.: 15/086,186

(22) Filed: Mar. 31, 2016

(51) Int. Cl.
*G10L 15/16* (2006.01)
*G06N 3/04* (2006.01)
*G06N 3/08* (2006.01)
*G06F 16/2452* (2019.01)

(52) U.S. Cl.
CPC ........ *G10L 15/16* (2013.01); *G06F 16/24522* (2019.01); *G06N 3/0445* (2013.01); *G06N 3/0472* (2013.01); *G06N 3/08* (2013.01)

(58) Field of Classification Search
CPC ... G01L 15/16; G06F 17/3043; G06N 3/0445; G06N 3/0472; G06N 3/08
See application file for complete search history.

(56) References Cited

U.S. PATENT DOCUMENTS

| 9,286,897 | B2 | 3/2016 | Bisani et al. |
| 9,807,473 | B2* | 10/2017 | Mei ............... H04N 21/8405 |
| 9,818,431 | B2* | 11/2017 | Yu ................... G10L 25/30 |
| 9,842,106 | B2 | 12/2017 | Hori et al. |
| 9,984,682 | B1 | 5/2018 | Tao et al. |
| 10,032,463 | B1* | 7/2018 | Rastrow ........... G10L 15/183 |

OTHER PUBLICATIONS

The Examiner's attention is hereby drawn to the specification and file history of co-pending U.S. Appl. No. 15/086,184, entitled "Confidence Checking for Speech Procesing and Query Answering", filed Mar. 31, 2016, which may contain information relevant to the present application.

* cited by examiner

*Primary Examiner* — Pho M Luu
(74) *Attorney, Agent, or Firm* — Pierce Atwood LLP

(57) ABSTRACT

New facts are added to a query answering system that uses automatic speech recognition (ASR) processing. Incoming ASR requests may be compared against each other to check accuracy of semantic processing. Further, accuracy of ASR transcription may be confirmed using a confidence check. Text obtained from internet or other sources may be processed with trained classifiers (which may be specific to a given relation) to identify text corresponding to the relation and to identify the entities referred to in the relation. The text, entities, and relation may then be saved and used to respond to future queries.

22 Claims, 26 Drawing Sheets

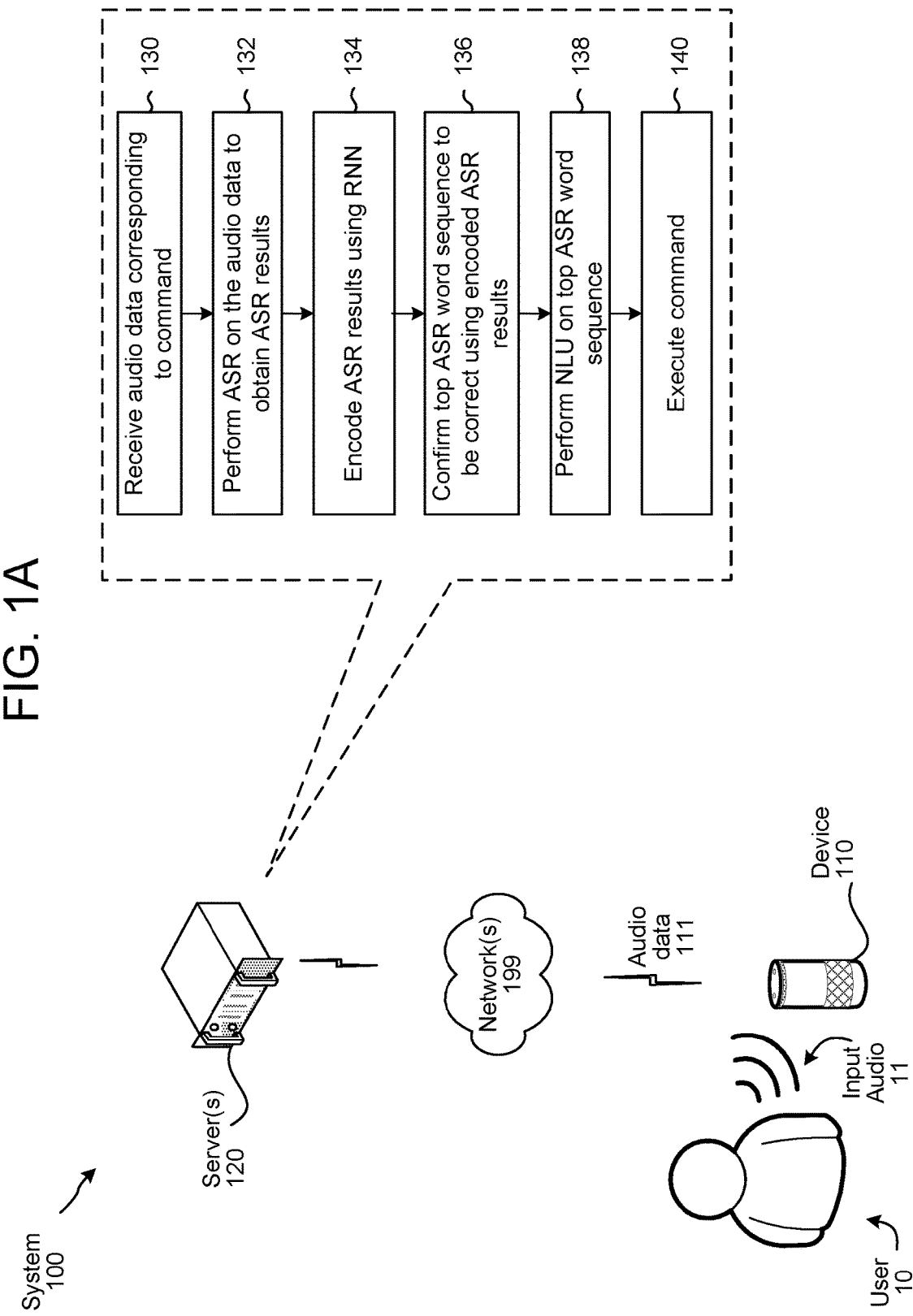

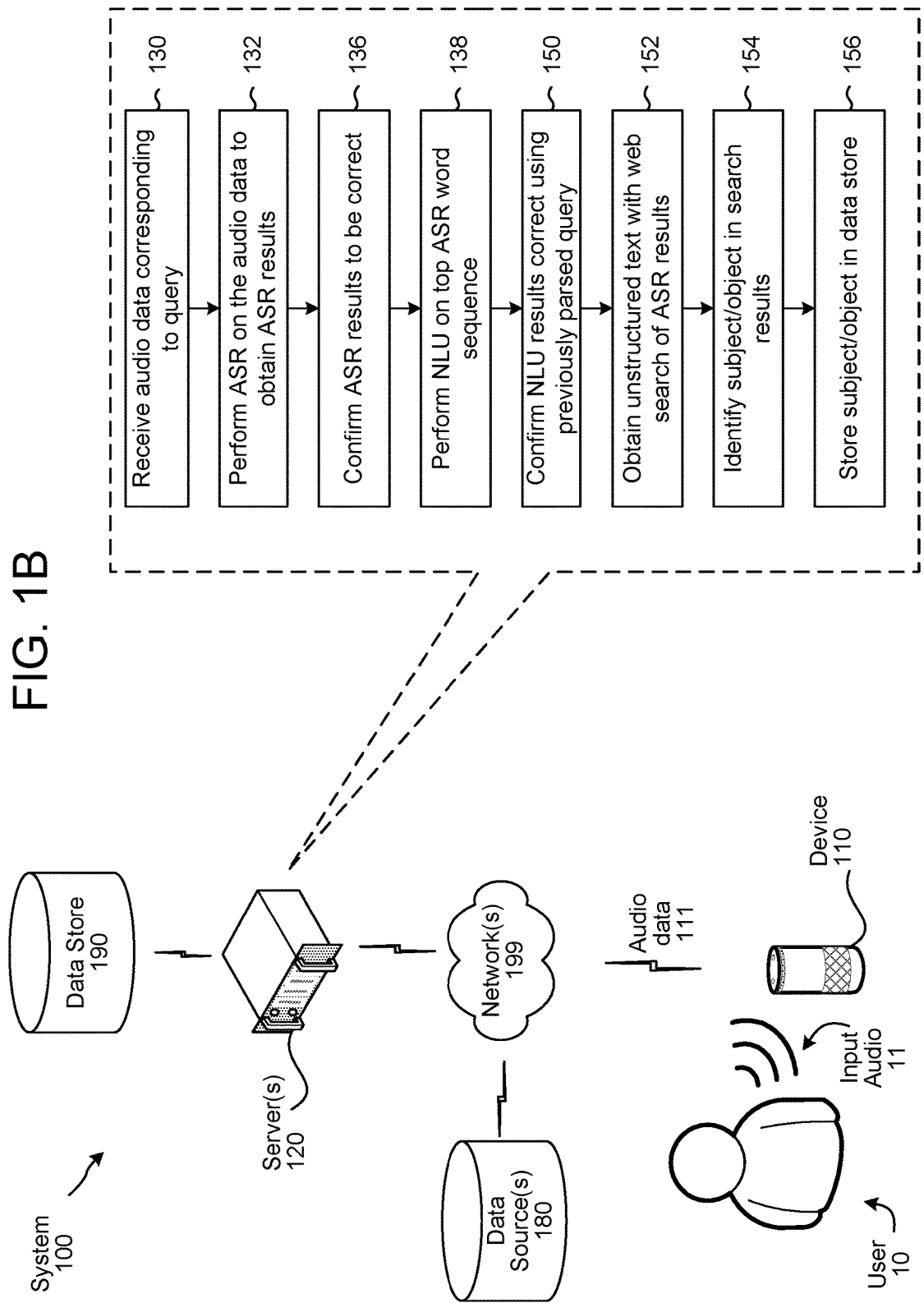

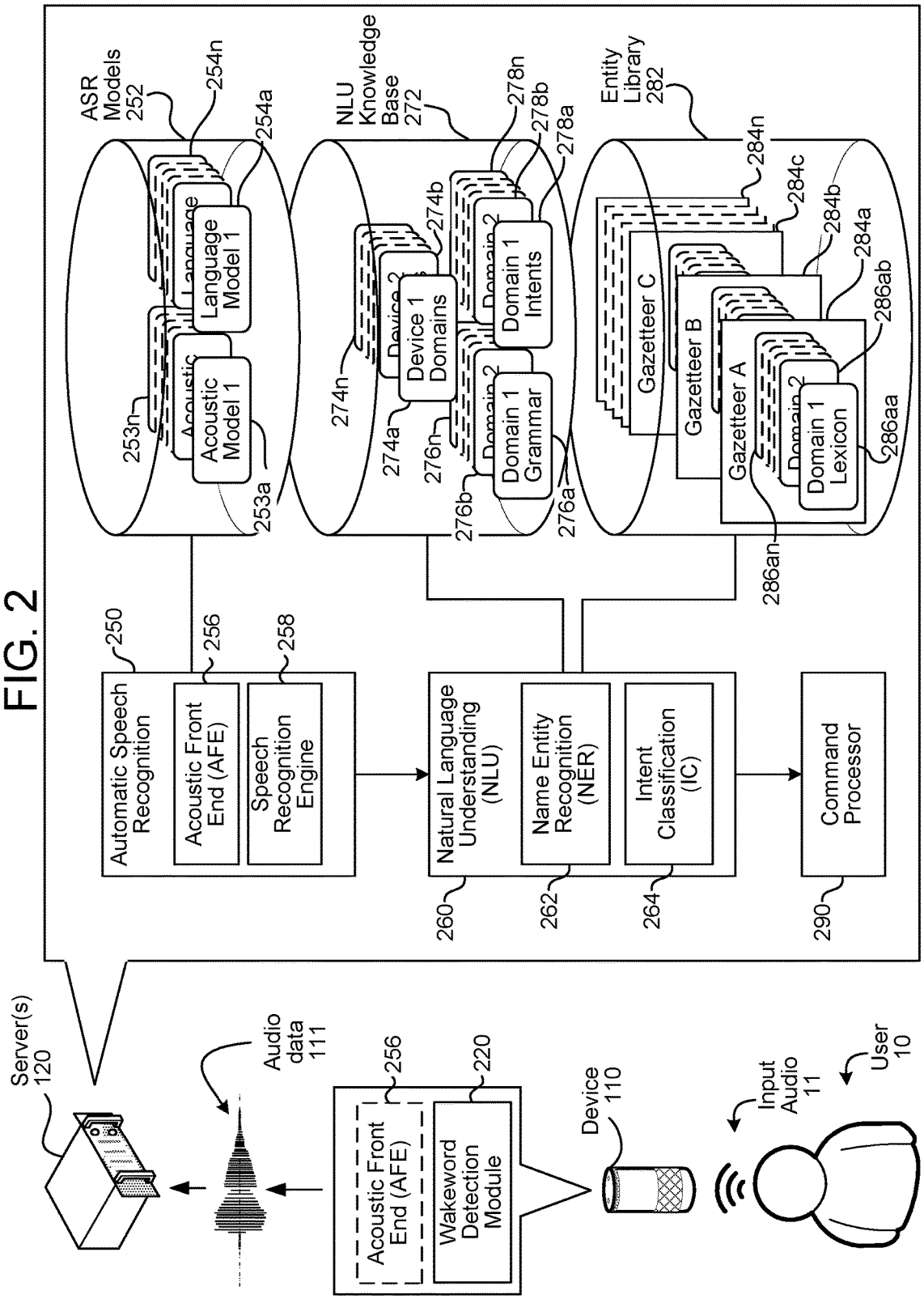

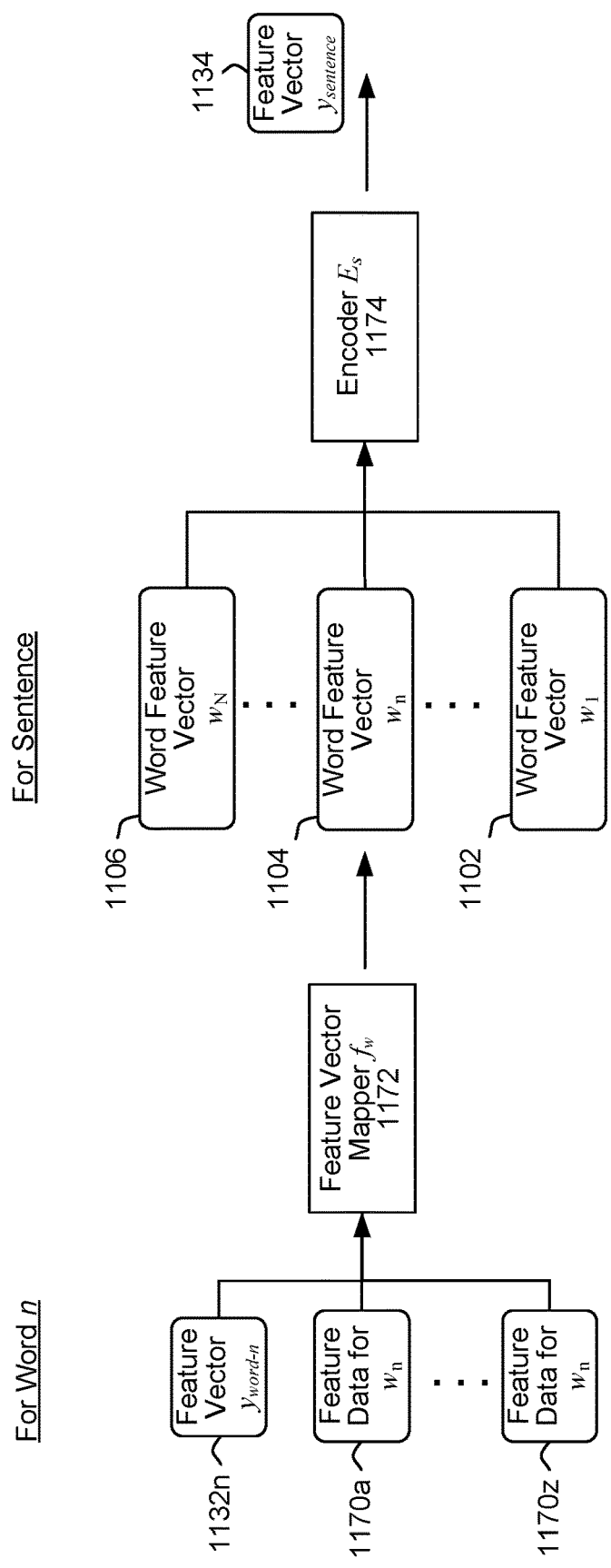

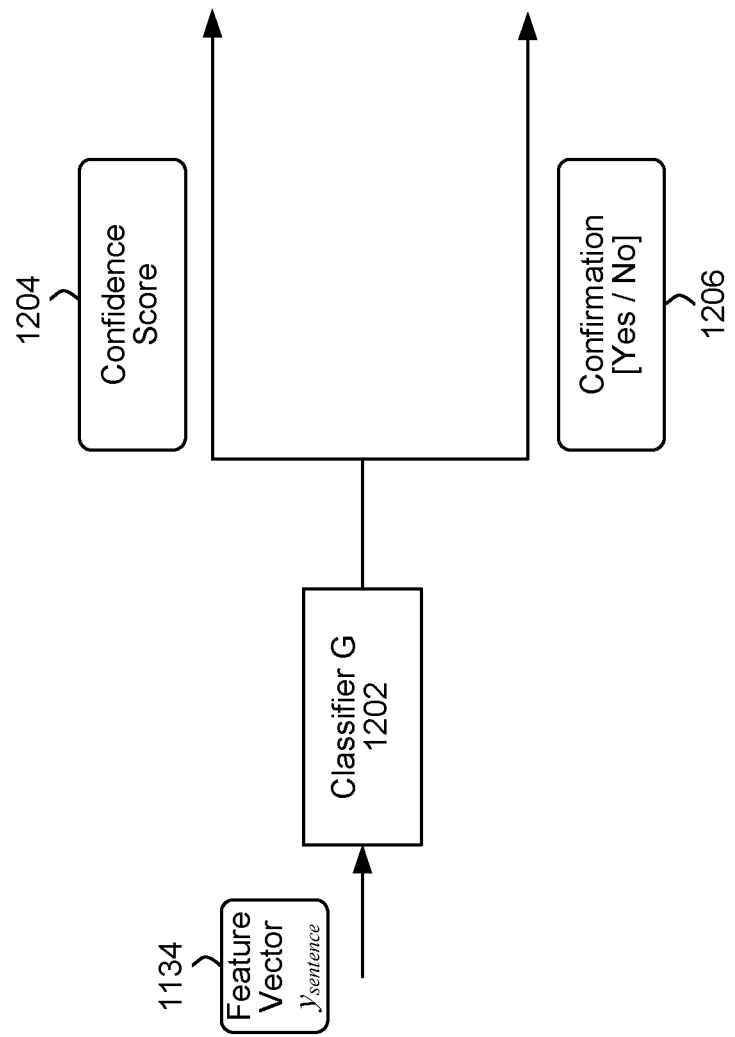

Second query similar to first query?
1332

Technique 1

Second query similar to first query?
1332

Technique 2

CONFIDENCE CHECKING FOR SPEECH PROCESSING AND QUERY ANSWERING

BACKGROUND

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A shows a system configured to perform speech recognition using a recurrent neural network representation of a lattice according to embodiments of the present disclosure.

FIG. 1B shows a system configured to determine unstructured data to incorporate into a system's information storage according to embodiments of the present disclosure.

FIG. 2 is a conceptual diagram of a speech processing system according to embodiments of the present disclosure.

FIG. 11C illustrates encoding word feature vectors for a particular word sequence/sentence according to embodiments of the present disclosure.

FIG. 12 illustrates using a trained classifier to confirm ASR results according to embodiments of the present disclosure.

DETAILED DESCRIPTION

Figure 3:
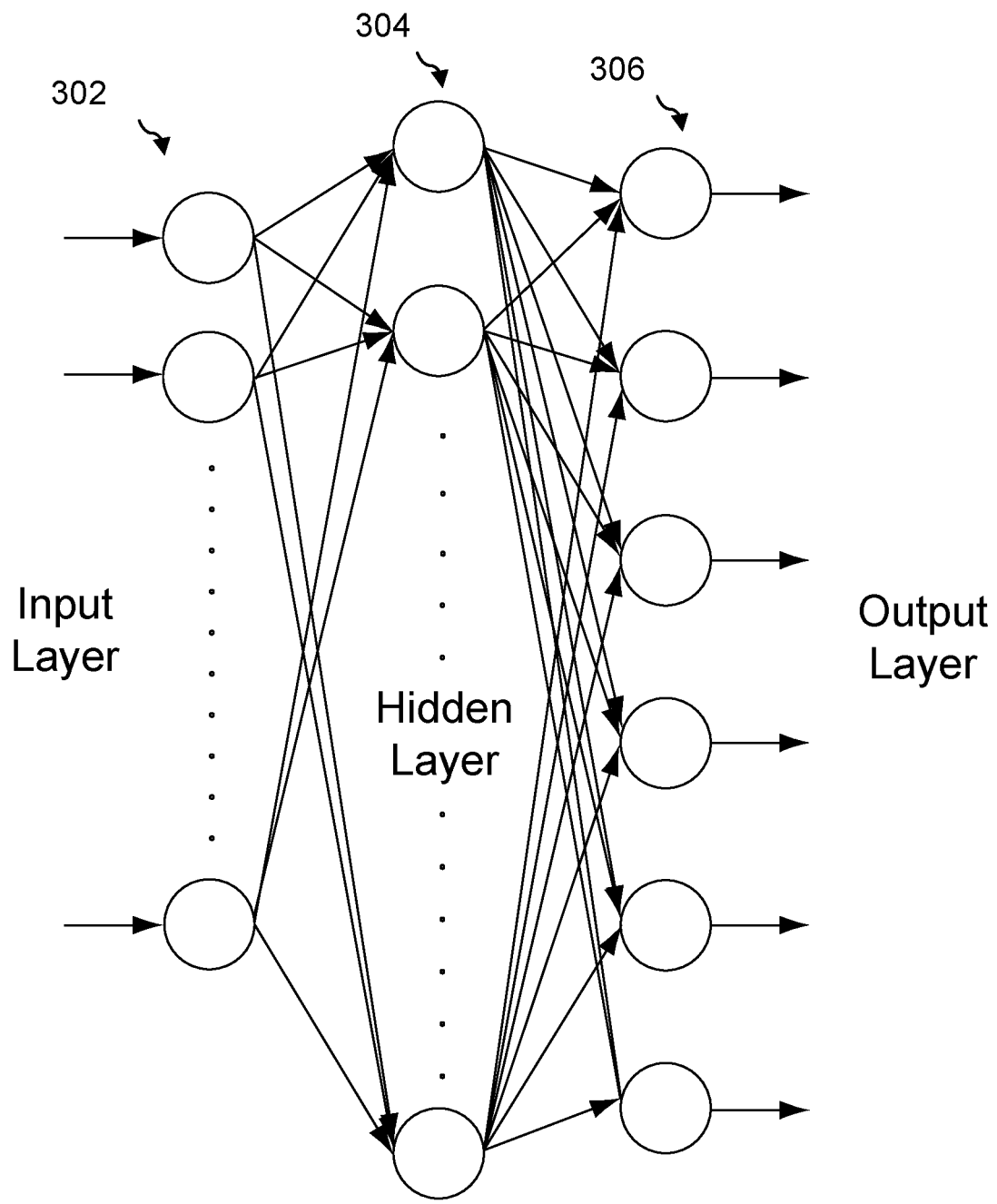
FIG. 3 illustrates a neural network for speech recognition according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

One common use for a speech processing system is query answering. This is when a user speaks a query to a device and the system searches for an answer to return to the user. In one example of query answering, a user speaks an utterance query to a local device, which in turn creates audio data corresponding to the utterance. The local device sends the audio data to a server, which processes the audio data using ASR and NLU, parses the query, and forwards the parsed query to a knowledge base. The knowledge base may be a database of semantically processed information (such as data stored in tuple form) that is used to answer queries. The knowledge base may send answer data back to the server, which may perform additional processing (such as text-to-speech processing) to create answer audio data which is sent back to the local device and played back for the user.

One limitation of such a query answering process is that the system may be limited in its ability to answer questions depending on what information is included in the knowledge base. That is, the more information is in the knowledge base, the more queries the system will be able to answer. Populating the knowledge base, however, may be a non-trivial task and may involve human operators to annotate and fact-check the information contained therein, thus ensuring that questions answered using information in the knowledge base are as correct as possible. One drawback to the knowledge base approach is that it may be expensive and time consuming. Alternate, more automated, methods of data acquisition for query answering may be prone to multiple points of inaccuracies or errors.

In particular, one method of automated data acquisition may involve receiving a spoken user query as outlined above, attempting (and failing) to answer the query using the knowledge base, instead performing a web search to obtain some answer data, and saving that answer data as information for use in answering future queries. This method suffers from several drawbacks as there are various points in the process where errors may occur. First, an error may occur in performing ASR processing on the incoming audio data from the user's device. Such an error will result in incorrect transcription of the question, and may result in storing data that is incorrect, irrelevant, or unresponsive to the query asked. Second, an error may occur in NLU processing, namely in determining the semantic interpretation of the ASR results. Such an error may also result in storing data that is incorrect, irrelevant, or unresponsive to the query asked.

Offered is a system and method that improves the ability of the system to answer user queries by expanding the information available to the system (either by expanding the knowledge base or by creating another repository of information) by the system using automated (i.e., not human supervised) techniques. The techniques described here include a confidence check on ASR output using encoded neural networks. Such a confidence check will allow the system to determine if an ASR transcription is in error prior to using it to supplement its information for query answering. Further, described is a system where a received query is compared against a previously received query to determine if they are semantically similar (i.e., asking for the same or similar information). If they are semantically similar, the likelihood is that was an NLU error is reduced. Thus, the system can remove ASR and NLU errors, making the subject query a candidate for one to use to add to the system's query answering information (which may include supplementing the knowledge base or saving the relevant information in some other data store).

The subject query text (which has a sufficient confidence for both ASR and NLU processing) may be used to run a web search to identify and obtain unstructured text that may be responsive to the query. Separate machine-learning trained classifiers may operate on the obtained unstructured text to identify a subject-object-relation triple, and use the triple to respond to the user's query as well as save the triple (and/or any of the associated unstructured text) for use in supplementing the system's knowledge base.

FIG. 1A shows a system 100 configured to perform speech recognition with a neural network according to one aspect of the disclosure. Although FIGS. 1A and 1B, and lower figures/discussion, illustrate the operation of the system in a particular order, the steps described may be performed in a different order (as well as certain steps removed or added) without departing from the intent of the disclosure. As shown in FIGS. 1A and 1B, a system 100 may include one or more devices 110 local to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1A, a device 110 receives an audio input 11 corresponding to a spoken utterance from the user 10. The device 110 may convert the audio 11 into audio data 111 and send the audio data to the server(s) 120. A server(s) 120 may then receive (130) the audio data 111 corresponding to the spoken utterance via the network 199. The server 120 performs (132) ASR processing on the audio data 111 to obtain ASR results. The ASR results may include not only a final result such as a highest scoring word sequence (i.e., the top hypothesis of an N-best list) but may also include a variety of other interim results, such as data that may not otherwise be output in a typical ASR process such as the identify of particular phones, senons, words, etc., confidence scores for the particular phones, senons, words, etc., posterior distributions over the phones, senons, words etc. for a particular ASR decoding lattice, or other data as explained below. The server 120 then encodes (134) the ASR results using a recurrent neural network (RNN). The server 120 then confirms (136) the top scoring ASR word sequence to be correct using the encoded ASR results. The word sequence may include multiple words or may include a single word (i.e., a word sequence with a length of one). The server 120 then performs (138) NLU processing on the top ASR word sequence and executes (140) the command associated with the NLU results. The command may be a query, which the system 100 responds to after reference to a knowledge base or other data store.

As shown in FIG. 1B, a device 110 receives an audio input 11 corresponding to a spoken utterance from the user 10. The device 110 may convert the audio 11 into audio data 111 and send the audio data to the server(s) 120. A server(s) 120 may then receive (130) the audio data 111 corresponding to the spoken utterance via the network 199. The spoken utterance may contain a query for information to be provided by the system 100. The server 120 performs (132) ASR processing on the audio data 111 to obtain ASR results. The server 120 then confirms (136) the top scoring ASR word sequence to be correct using the encoded ASR results. This may be done using encoded ASR results, or using a different technique. The server 120 then performs (138) NLU processing on the top ASR word sequence. The server 120 then confirms (150) the NLU results using a previously parsed query, for example if the audio data received in step 130 corresponds to a rephrase of a previous query. The server 120 then obtains (152) unstructured text by performing a web search using the ASR results (i.e., the top scoring word sequence from the audio data). The unstructured text may come from one or more data source(s) 180. The server then identifies (154) a subject or object in the search results corresponding to the query. The system then stores (156) the subject or object in a data store 190, which may include a knowledge base or a different information storage component.

Further details of performing speech recognition at the RNN are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword (which may be a word sequence rather than a single word), the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more audio frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection may be performed as simplified ASR processing, potentially without performing certain linguistic analysis, textual analysis or semantic analysis.

The wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recurrent neural network (RNN) structures directly, without HMM involved. Such a system may estimate the posteriors of wakewords with context information, either by stacking audio frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phones) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into audio frames representing a time intervals for which the AFE determines a number of values, called features, representing the qualities of the audio data, along with a set of those values, called a feature vector, representing the features/qualities of the audio data within the audio frame. In one configuration each audio frame includes 25 ms of audio and the frames start at 10 ms intervals resulting in a sliding window where adjacent audio frames include 15 ms of overlapping audio. Many different features for a particular frame may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phones and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phone. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phones, for example using Hidden Markov Models (HMMs) to determine probabilities that feature vectors may match phones. Sounds received may be represented as paths between states of the HMM and multiple paths may represent multiple possible text matches for the same sound. Instead of (or in addition to) phones, senons may be used as an acoustic unit. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge exchange 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge exchange 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's knowledge exchange 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Neural networks may be used to perform ASR processing including acoustic model processing and language model processing. An example neural network for ASR is illustrated in FIG. 3. A neural network may be structured with an input layer 302, a middle layer 304, and an output layer 306. The middle layer may also be known as the hidden layer. Each node of the hidden layer is connected to each node in the input layer and each node in the output layer. Although illustrated in FIG. 3 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 4:
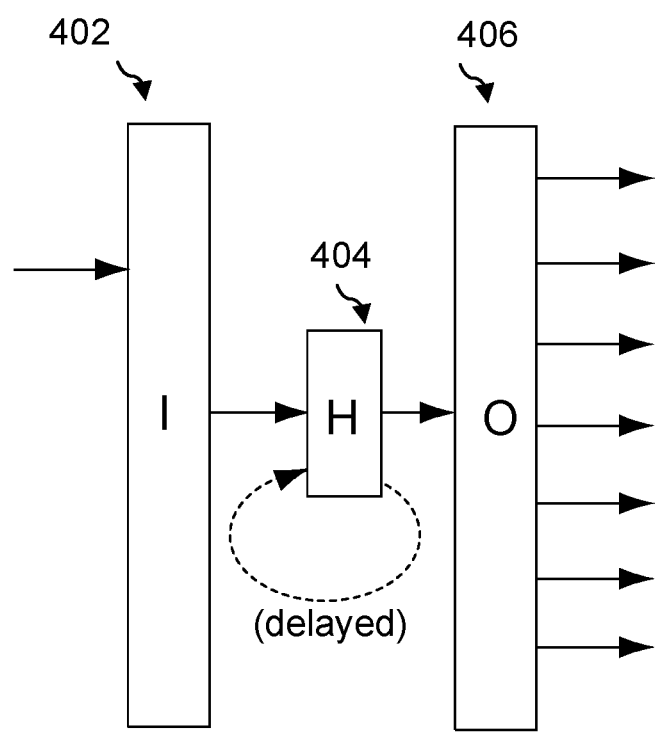
FIG. 4 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 4. Each node of the input layer 402 connects to each node of the hidden layer 404. Each node of the hidden layer 404 connects to each node of the output layer 406. As illustrated, the output of the hidden layer 404 is fed back into the hidden layer for processing of the next set of inputs. A neural network incorporating recurrent connections may be referred to as a recurrent neural network (RNN).

In the case where an acoustic model uses a neural network, each node of the neural network input layer may represents an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 4, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

As noted above, during speech recognition, an ASR module 250/speech recognition engine 258 may utilize acoustic models 253 to determine possible phones or other phonetic units that match the incoming audio data feature vectors. The probable phones and related states/state transitions may be formed into paths traversing a lattice of potential phones. Each path represents a progression of phones that potentially match the audio data represented by the feature vectors. One path may overlap with one or more other paths depending on the recognition scores calculated for each phone. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data.

For example, for an input audio sounding like "hello," acoustic model processing that returns the potential phone paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5:
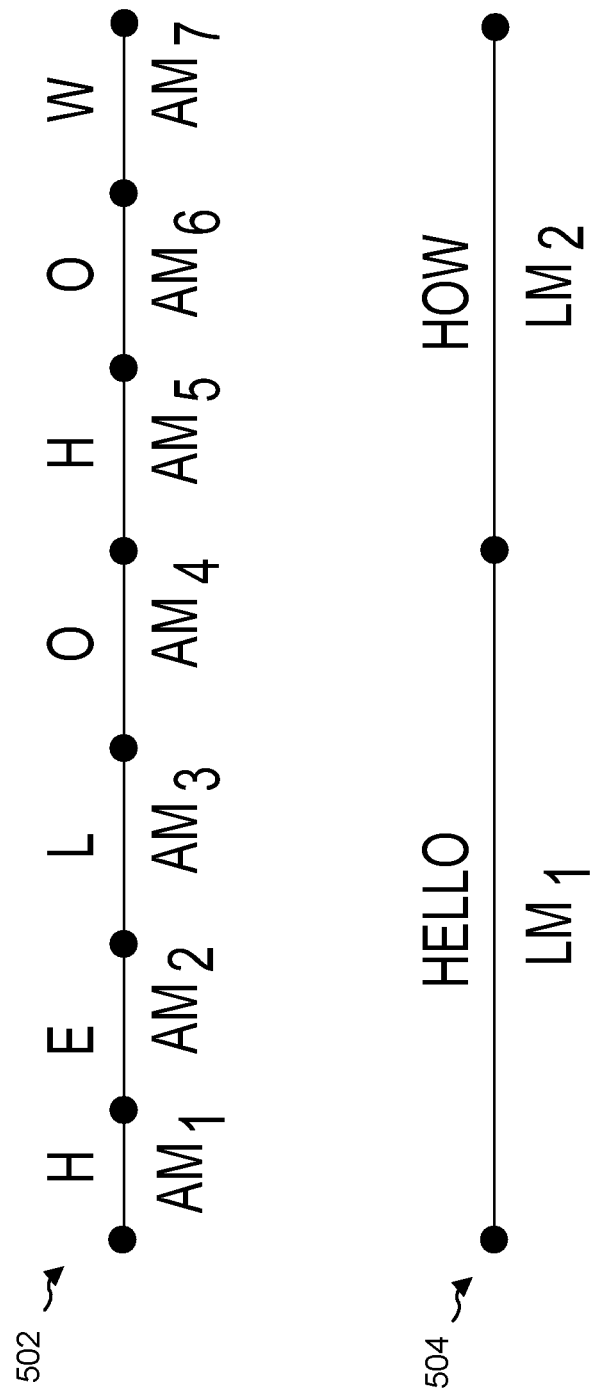
FIG. 5 illustrates phone processing and word processing according to embodiments of the present disclosure.

FIG. 5 illustrates the relationship between acoustic modeling and language modeling. As illustrated, each processed phone included in the path 502 is associated with an acoustic model score $AM_1$ through $AM_7$. The language model is then applied to associate each word in the path 504 with a language model score $LM_1$ or $LM_2$.

As part of the language modeling (or in other phases of the ASR processing) the speech recognition engine 258 may, to save computational resources, prune and discard low recognition score states or paths that have little likelihood of corresponding to the spoken utterance, either due to low recognition score pursuant to the language model, or for other reasons. Such pruned paths are considered inactive. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are considered active hypotheses.

Figure 6:
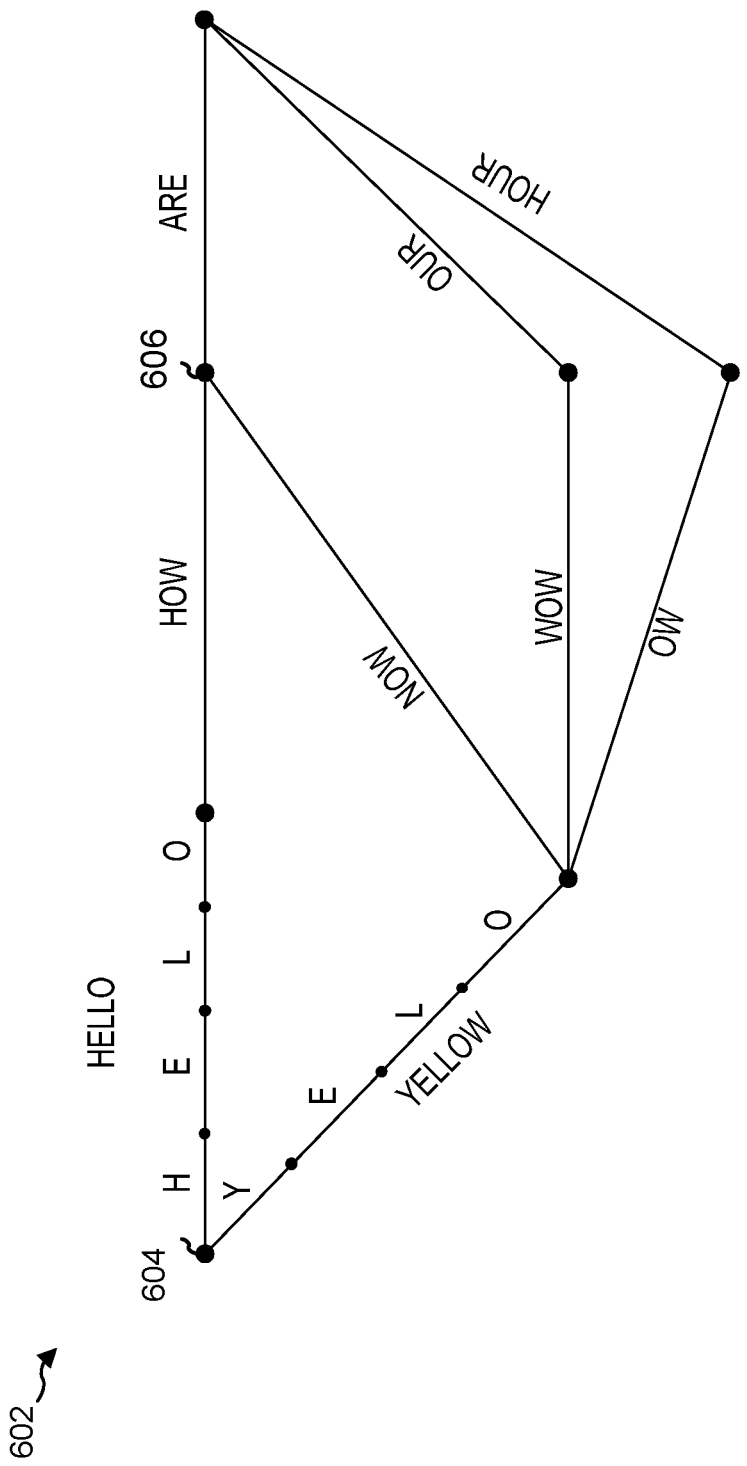
FIG. 6 illustrates a speech recognition lattice according to embodiments of the present disclosure.

The speech recognition engine 258 may combine potential paths into a lattice representing speech recognition results. A sample lattice is shown in FIG. 6. The lattice 602 shows multiple potential paths of speech recognition results. Paths between large nodes represent potential words (for example "hello", "yellow", etc.) and paths between smaller nodes represent potential phones (for example "H", "E", "L", "O" and "Y", "E", "L", "O"). For purposes of illustration, individual phones are only shown for the first two words of the lattice. The two paths between node 604 and node 606 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated feature vectors.

Different arcs may also be associated with the same time data. For example, the arc "hello" may be associated with time data for a first group of audio frames that were processed by the speech recognition engine 258 to traverse the arc corresponding to "hello." The same time data may also be associated with the arc "yellow" as the same first group of audio frames were processed to traverse the arc "yellow" as the arc corresponding to "hello," that is the speech recognition engine 258 determined two potential words that may correspond to that first group of audio frames. The time data may be associated with those arcs for purposes of a matrix/vector representation of the lattice 602.

Figure 7:
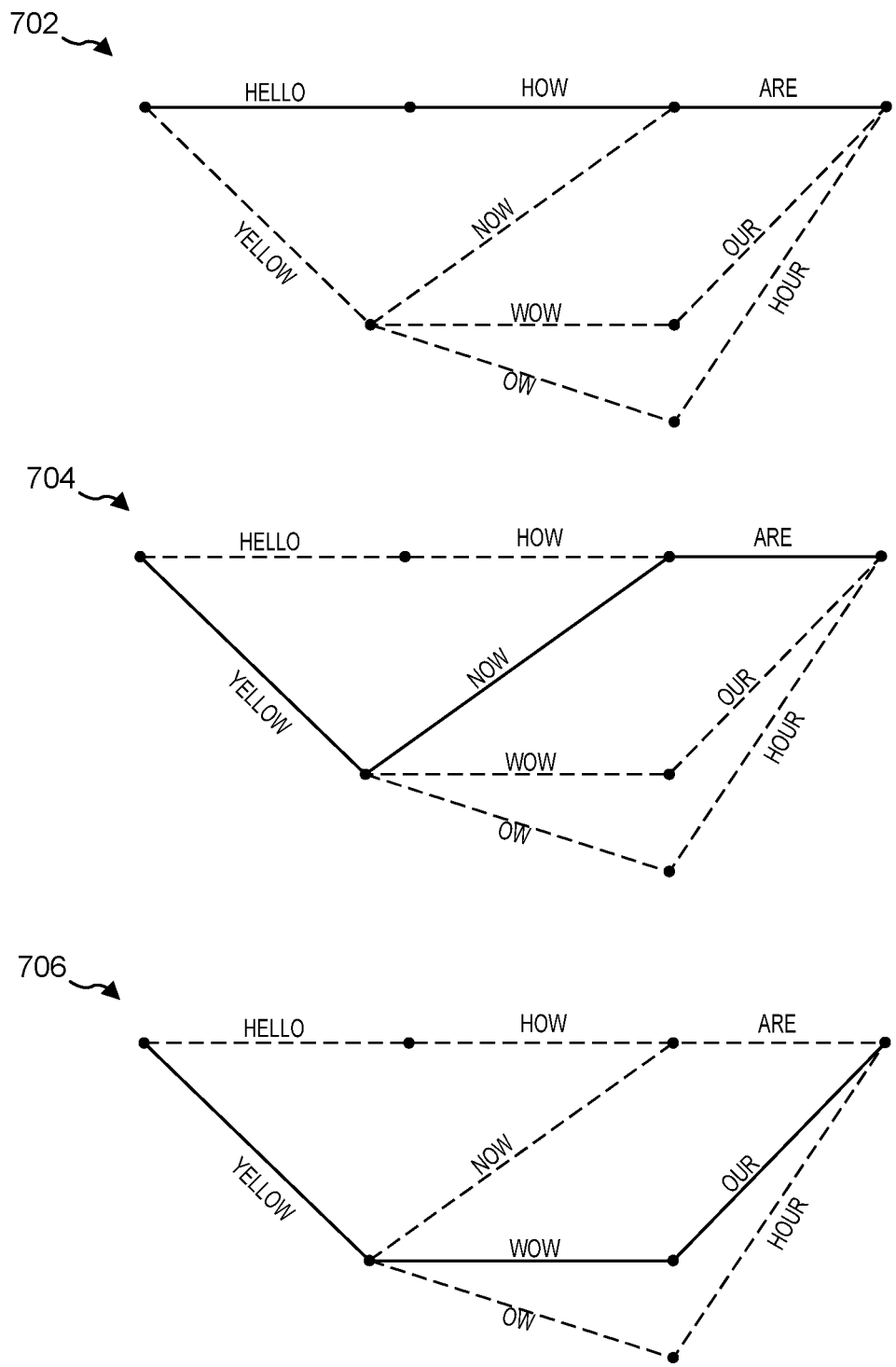
FIG. 7 illustrates different ways of traversing the lattice of FIG. 6 according to embodiments of the present disclosure.
Figure 8:
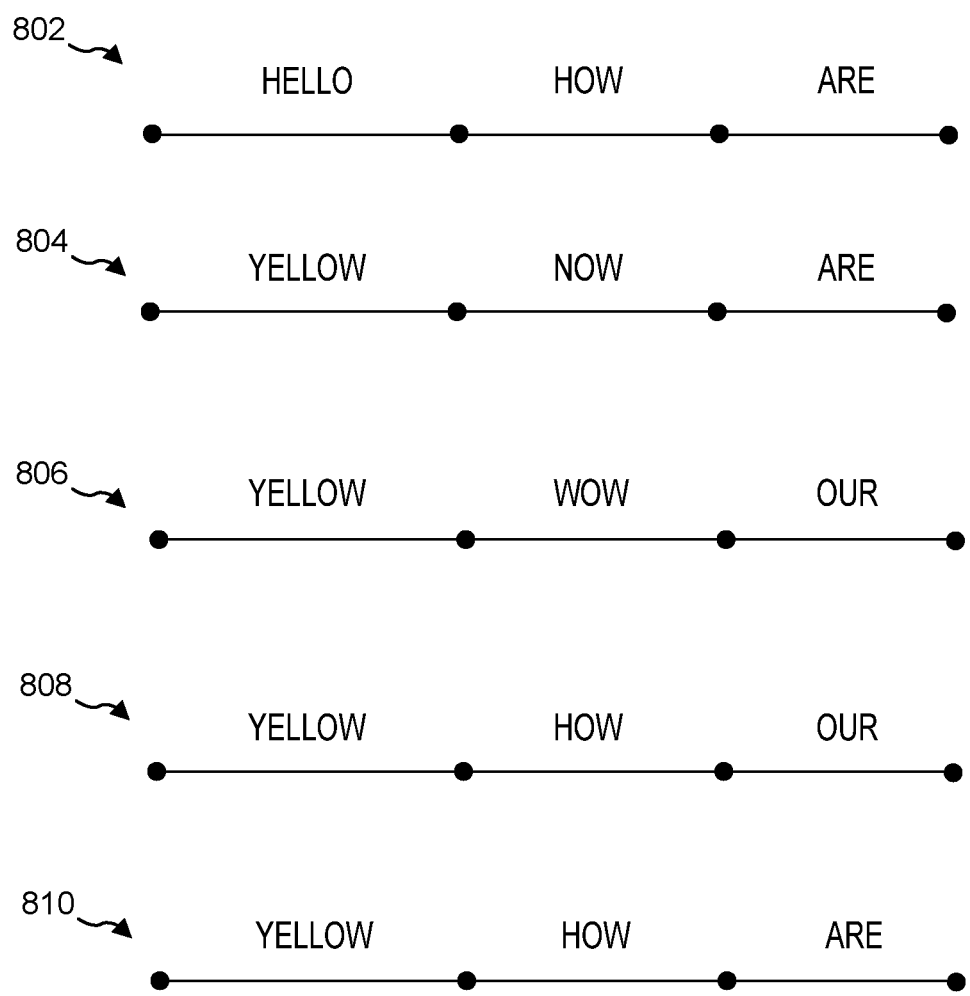
FIG. 8 illustrates an N-best list of hypotheses associated with the lattice of FIG. 6 according to embodiments of the present disclosure.

Illustrated in FIG. 7 are different potential paths along the lattice 602. As shown in FIG. 7, path 702 results in "hello how are," path 704 results in "yellow now are" and path 706 results in "yellow wow our." As can be seen, many such paths are possible even in the small example lattice 602. An example of such paths 802-810 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component may output an N-best list, such as the list of potential results shown in FIG. 8, may output a single top scoring answer (e.g., 802) or may output an entire lattice.

In addition to the traditional top sentence of words or N-best result, an ASR component may be configured to output various data calculated by the ASR component during processing. Such data may include, for example, speech units (such as phones), probabilities/scores associated with certain speech units or words, audio frame timing, or the like. A system may be configured to use such data to perform various tasks, for example to confirm the results of ASR processing, which may in turn be used to perform various processing to update a store of facts and information available to a system for query answering.

To use such ASR data effectively, however, certain techniques may be employed to make the data more easily operable by the system. One such technique, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) related to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations. $x_1$ In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. For example, F may be between 100 and 1000 values for use in speech processing, but any size may be used. Any particular encoder 950 will be configured to output vectors of the same size, thus ensuring a continuity of output encoded vector size from any particular encoder 950 (though different encoders may output vectors different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a recurrent neural network (RNN), for example as an long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
bi-linear, essentially the concatenation of a forward and a backward embedding, or
tree, based on parse-tree of the sequence, In addition, an attention model can be used, which is another RNN or DNN that learns to "attract" attention to certain parts of the input. The attention model can be used in combination with the above methods of consuming the input.

Figure 9:
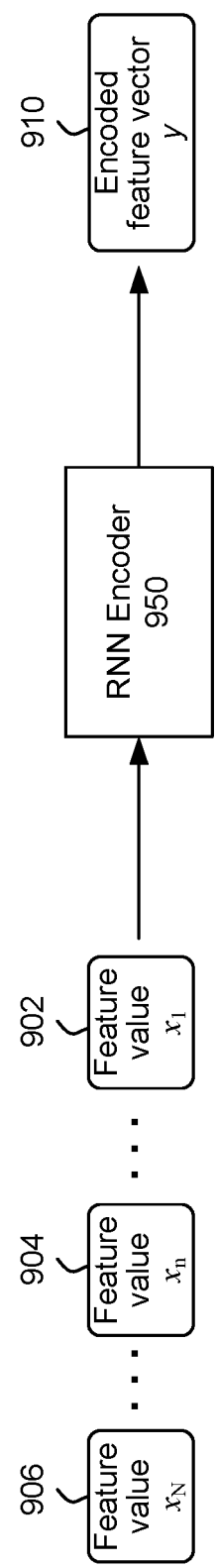
FIG. 9 illustrates operation of an encoder according to embodiments of the present disclosure.

FIG. 9 illustrates operation of the RNN encoder 950. The input feature value sequence, starting with feature value $x_1$ 902, continuing through feature value $x_n$ 904 and concluding with feature value $x_N$ 906 is input into the RNN encoder 950. The RNN encoder 950 may process the input feature values as noted above. The RNN encoder 950 outputs the encoded feature vector y 910, which is a fixed length feature vector of length F. An encoder such as 950 may be used with speech processing as indicated below.

For ASR processing the base input is typically audio data in the form of audio frames. As noted above, typically acoustic features (such as log-filter bank energies (LFBE) features, MFCC features, or other features) are determined and used to create feature vectors for each audio frame. It is possible to feed audio data into an RNN, using the amplitude and (phase) spectrum of a fast-Fourier transform (FFT), or other technique that projects an audio signal into a sequence of data. If alignment of the acoustic features exists, it may be added as an additional input. The alignment information can be either provided as a one-hot vector using the Viterbi alignment, or as a probability distribution over all possible states using a Baum-Welch alignment. Alignments can be provided at the level of senons, phones, or any other level suitable for the application.

For NLU processing the base input is typically text in the form of word sequences. A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

To encode a word sequence using an RNN, for example, the RNN encoder is presented with each word of the sequence one by one. The RNN processes the first word, then the second word, and so on. The RNN has mechanism to preserve its state which has all the information from all previous states. Thus, for each word the RNN processes the word and its internal state, thus operating in a recurrent fashion. After the last word, the final state is a representation of the entire vector corresponding to the word sequence. T Now the word sequence is represented as a fixed size vector (i.e., the encoder output) in a vector space and operated on accordingly.

The encoder RNN may be trained using known techniques, for example the stochastic gradient descent (SGD) method with the backpropagation-through-time (BTT) algorithm to propagate an error signal through the sequence thereby learning the parameters of the encoder network.

A classifier is a known machine learning based tool to classify inputs into certain configured classes. To use the RNN encoded vectors, a classifier may be trained to classify an input set of features $x_1, \ldots x_N$ into a fixed number of classes $1 \ldots C$ (where C may be two, and the classifier may be configured to simply classify an input feature vector into one category or the other). To configure a classifier to operate on RNN encoded data a DNN with a softmax layer and an RNN-encoder may be used. Depending on the output size a hierarchical softmax layer can be used as known in the art. The DNN takes the RNN-encoder output as input and produces a probability distribution over all classes where the highest scoring class may be selected. In mathematical notation, given a sequence $x_N$, and an encoder E, the classifier H may be expressed as:

$$H_E(x_1, \ldots x_N) := \mathrm{argmax}\, p(c|E(x_1, \ldots x_N)) \qquad (1)$$

where p(c|y) is implemented as a DNN.

Encoder RNN E and classifier H may be trained jointly using the SGD method with the cross-entropy objective function and the backpropagation-through-time (BTT) algorithm. Instead of SGE, any other machine learning technique that applies to learning neural networks can be applied to BTT. The encoder E may be trained on sample sequences of feature data. The classifier H may be trained together with encoder E. Known machine learning techniques may be used to train H and E, for example using a gradient feedback technique to update parameters/weights in H and E.

ASR Output Verifications Using Hierarchical Encoding

The above techniques for encoding and classification may be used to confirm whether an ASR results is correct, i.e., classifying an ASR result as either (1) correct or (2) not correct. Alternatively, the above techniques may be used to assign a confidence score to a particular ASR result. Practically, ASR processing (i.e., determining the right sentence from acoustic data) is computationally more challenging than ASR output verification (i.e., determining whether the sentence is correct), thus output verification may be performed on ASR results with limited latency impact.

Verifying the ASR output as correct (or not) may have various practical implications. For example, rather than passing an ASR output directly from an ASR module 250 to an NLU module 260 and eventually to a command processor 290, the system may first determine, using a classifier trained using these techniques, whether the ASR result (i.e., top scoring output word sequence) is correct. If the result is correct (or has a confidence score above a threshold) the system may pass the results to downstream components. If the result is not correct (or has a confidence score below the threshold) the system may request a user to restate an utterance or present the ASR results to the user for confirmation (e.g., outputting "please restate your request" or "you said 'play music by Queen.' Is that correct?").

In another example, if a wakeword is determined to have been detected, ASR output verification may be performed to confirm wakeword detection. If the wakeword is not confirmed (i.e., the wakeword detection is determined to have a confidence below a threshold), a device may not wake. Whereas if the wakeword is confirmed (i.e., the wakeword detection is determined to have a confidence above the threshold), the device may wake.

To perform ASR output verification, ASR output may be encoded using the above techniques, and in a hierarchical manner, to create a feature vector that may be operated on by a classifier to determine whether the output is correct (and/or a corresponding confidence or probability of correctness).

Figure 10A:
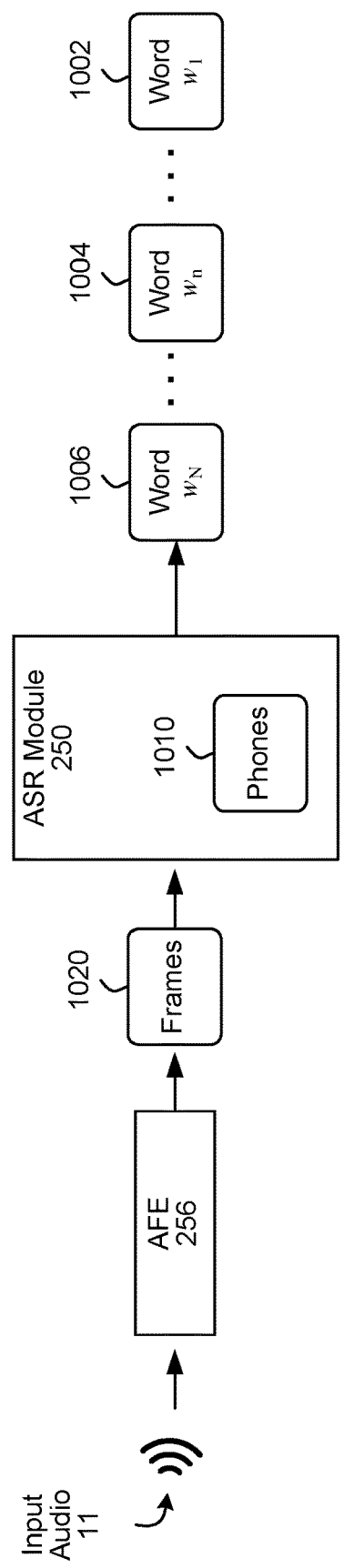
FIGS. 10A-10B illustrate speech processing according to embodiments of the present disclosure.

Various data is used during the course of ASR processing. That data may be considered to be in three hierarchical levels, the frame level, the phone level, and the word level. Some of that data is raw audio data that is obtained prior to ASR processing (for example, acoustic feature data as determined by an AFE 256) and other data is created during ASR processing (called ASR result data) and may include a variety of data determined by the ASR module 250. As illustrated in FIG. 10A, input audio 11 is input into the AFE 256 which creates the frames 1020. The frames 1020 are input into the ASR module 250 which performs ASR processing on the frames 1020 to determine phones 1010 and ultimately to determine and output a sequence of words, illustrated by the sequence of word $w_1$ 1002, through word $w_n$ 1004 and ending with word $w_N$ 1006. Typically, a system may only use the highest scoring sequence of words as output by the ASR module 250, while the other data is discarded. Offered, however, is a method of encoding the ASR data (and other data) that might otherwise be discarded in a form that can be used to verify the correctness of a top scoring ASR word sequence using a variety of data, including ASR result data that is not typically output by the ASR module 250, including information about the phones 1010, as well as other information about the various hierarchies of the ASR processing.

Figure 10B:
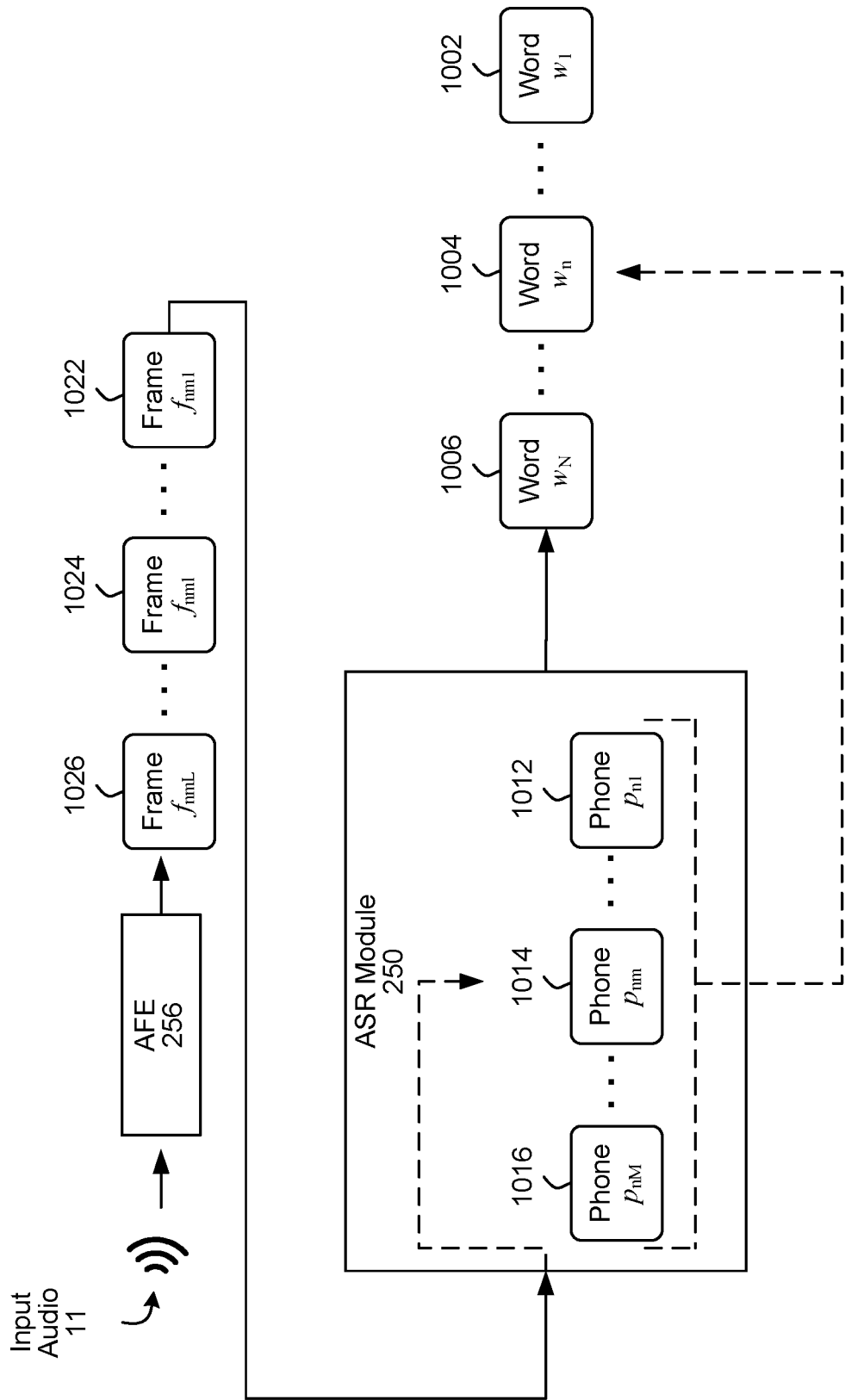

The various hierarchical levels may be represented as:
a sequence of words 1-N as determined by the ASR module 250 represented as: $w_1, \ldots w_n, \ldots w_N$
a sequence of phones for each word as determined by the ASR module 250, where the number of phones 1-M for word n is represented as: $p_{n1}, \ldots p_{nm}, \ldots p_{nM}$ and where each word has a corresponding phone sequence
a sequence of audio frames for each phone, as determined by the AFE 256, but whose times are delineated by the ASR module 250, where the number of frames 1-L for phone m is represented as: $f_{nm1}, \ldots f_{nml}, \ldots f_{nmL}$ and where each phone has a corresponding frame sequence Thus, a word includes many different phones and a phone includes many different frames. As illustrated in FIG. 10B, and working backwards, a particular word $w_n$ 1004 is determined by the ASR module 250 based on a sequence of phones, in particular the sequence of phone $p_{n1}$ 1012, through phone $p_{nm}$ 1014 and ending with phone $p_{nm}$ 1016. Similarly, a particular phone $p_{nm}$ 1014 is determined by the ASR module 250 based on a sequence of frames, in particular the sequence of frame $f_{nm1}$ 1022, through frame $f_{nml}$ 1024 and ending with frame $f_{nmL}$ 1026. This illustration may be extrapolated through each word, each phone for each word, and each frame for each phone.

The mapping from phones to frames may come from an alignment provided by a Viterbi decoder, which runs against the acoustic features during ASR processing. Thus the ASR processing may determine the start and end time (and thus length) of a particular phone. The mapping from words to phones may come from a pronunciation lexicon operated by the ASR module 250.

A variety of data features may be determined that describe characteristics of each item in a hierarchical level. Thus, there are a variety of word level features that describe characteristics of a particular word. There are also a variety of phone level features that describe characteristics of a particular phone. There are also a variety of frame level features that describe characteristics of a particular frame. As described below, these characteristics may be used and encoded in a manner to create a feature vector that may be used for various purposes, including checking the accuracy of ASR results, in particular a word or sequence of words.

Figure 11A:
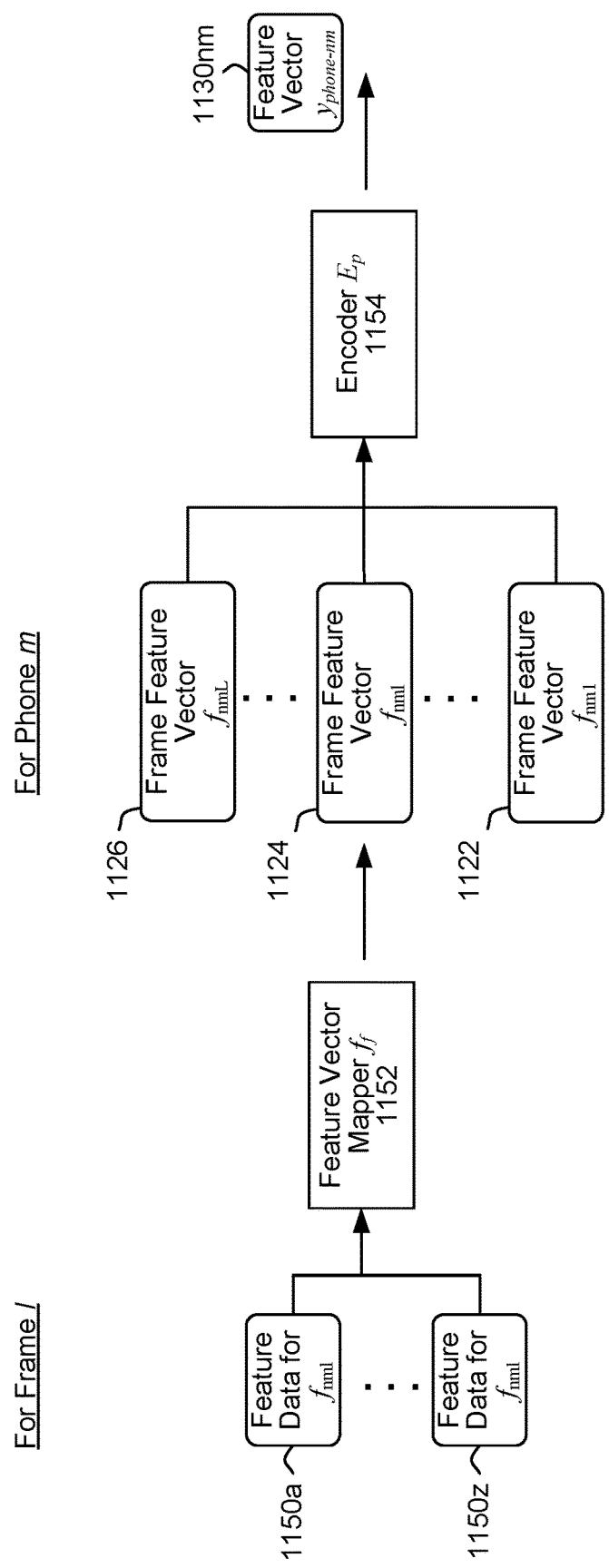
FIG. 11A illustrates encoding frame feature vectors for a particular phone according to embodiments of the present disclosure.

Given a top scoring word recognition result $w_1, \ldots w_N$ from the ASR module 250 a hierarchical set of features is defined. On the frame level, each frame has:
its corresponding acoustic feature(s) (e.g., LFBE or MFCC features), as determined by the AFE 256
a phone and senon identity to which the frame belongs as determined by the ASR 250
a posterior distribution over all phones and senon derived from the acoustic model Other frame data value features may also be determined in addition to, or instead of, the above frame feature values. Various combinations of frame feature values are possible. Whatever frame features are used, the values for those frame features may be combined into a feature vector where each frame has a feature vector including data corresponding to the feature categories. The function $f_f$ ($f_{nml}$) may be defined as the mapping of frame $f_{nml}$ (i.e., frame l, which is in phone m, which is in word n) to its feature vector. As shown in FIG. 11A, a particular frame $f_{nml}$ may be associated with a variety of feature data values 1150a through 1150z. That data may be processed by a feature vector mapper 1152 to determine the frame feature vector 1124 corresponding to frame $f_{nml}$. Thus feature vector 1124 is based on data describing characteristics of frame $f_{nml}$. Similar feature vectors may be determined for other frames, resulting in, for example, frame feature vector 1122 for frame $f_{nm1}$ through feature vector 1126 for frame $f_{nmL}$.

Figure 11B:
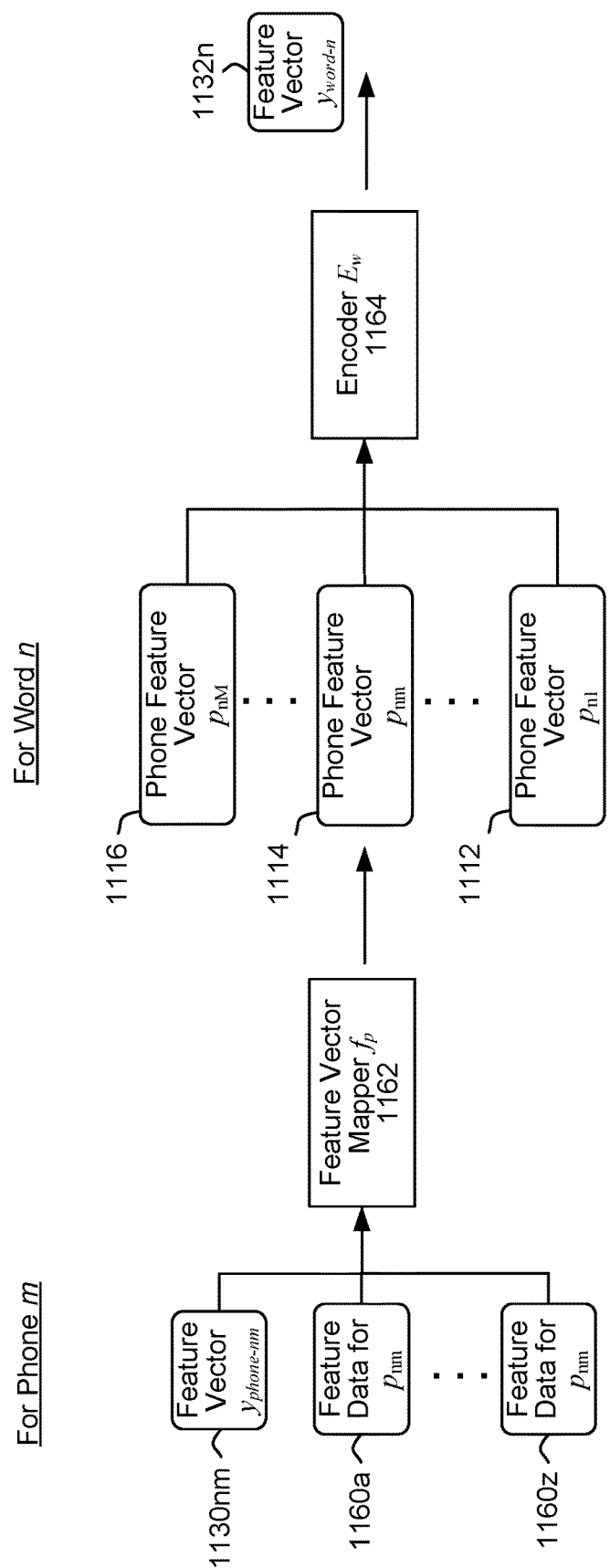
FIG. 11B illustrates encoding phone feature vectors for a particular word according to embodiments of the present disclosure.

At the phone level, an RNN encoder E may be used to map the sequence of feature vectors for each frame corresponding to a particular phone (i.e., mapping feature vector $f_{nml}$ through feature vector $f_{nmL}$ for phone m in word n) into a fixed sized feature vector $y_{phone-nm}$. Such a mapping may be expressed as follows: $y_{phone-nm} = E_p(f_f (f_{nml}) \ldots (f_{nmL}))$. Thus, as shown in FIG. 11A, encoder $E_p$ 1154 may encode frame feature vectors 1122 through 1126 into feature vector $y_{phone-nm}$ 1130nm. In certain instances, encoder $E_p$ 1154 may be a single encoder used to encode the feature vectors for each phone. In another instances, given a phone set $p_1 \ldots p_K$, a different encoder may be built for each phone, namely encoders $E_{p1} \ldots E_{pK}$. Thus for a specific phone, its specific encoder will be used to encode the fixed size feature vector for that specific phone. The feature vector $y_{phone-nm}$ 1130nm representing the data about the phone's frames may be one data point associated with the particular phone. Other data points for the phone may include:
the duration of the phone (in seconds or number of frames). This data point may indicate an error if a phone has an very long or very short duration
the phone's duration relative to the duration of the word within the phone
the particular phone identity (which may be an index entry pointing the phone's entry in an index of phones).
the particular senon identity corresponding to the particular phone (which may be an index entry pointing the senon's entry in an index of senons).
the phone confidence from the ASR decoding lattice
the senon confidence from the ASR decoding lattice
posterior distribution over all phones derived from the ASR decoding lattice
posterior distribution over all senons derived from the ASR decoding lattice
expected frequency of the phone; i.e., how often the particular phone is expected to be seen, computed a-priori based on a training data set
expected frequency of the senon; i.e., how often the particular senon is expected to be seen, computed a-priori based on a training data set
expected error of the phone; i.e., how often the system made an error determining the particular phone based on processing during some training activity, computed a-priori expected error of the senon; i.e., how often the system made an error determining the particular senon based on processing during some training activity, computed a-priori Other phone data value features may also be determined in addition to, or instead of, the above phone feature values. Various combinations of phone feature values are possible. Whatever phone features are used, the values for those phone features may be combined into a feature vector where each phone has a feature vector including data corresponding to the feature categories. The function $f_p(p_{nm})$ may be defined as the mapping of phone $p_{nm}$ (i.e., phone m which is in word n) to its feature vector. As shown in FIG. 11B, a particular phone $p_{nm}$ may be associated with a variety of feature data values 1160a through 1160z. That data, along with feature vector $y_{phone-nm}$ 1130nm representing the data about the phone's frames, may be processed by a feature vector mapper 1162 to determine the phone feature vector 1114 corresponding to phone $p_{nm}$. Thus feature vector 1114 is based on data describing characteristics of phone $p_{nm}$ as well as based on data describing characteristics of frame $f_{nml}$ (and based on data describing frames $f_{nm1}$ through $f_{nmL}$). Similar feature vectors may be determined for other phones, resulting in, for example, phone feature vector 1112 for phone $p_{n1}$ through feature vector 1116 for phone $p_{nM}$.

At the word level, an RNN encoder E may be used to map the sequence of feature vectors for each phone corresponding to a particular word (i.e., for phone n, feature vector $p_{n1}$ through feature vector $p_{nM}$) into a fixed sized feature vector $y_{word-n}$ as follows. Such a mapping may be expressed as follows: $y_{word-n}=E_w(f_p(p_{nM}) \ldots (p_{nM}))$. Thus, as shown in FIG. 11B, encoder $E_w$ 1164 may encode phone feature vectors 1112 through 1116 into feature vector $y_{word-n}$ 1132n. That feature vector $y_{word-n}$ representing the data about the word's phones may be one data point associated with the particular word. Other data points for the word may include:

the duration of the word (in seconds or number of frames)
the number of phones in the word
the word confidence from the ASR decoding lattice
expected frequency of the word; i.e., how often the particular word is expected to be seen, computed a-priori based on a training data set
expected error of the word; i.e., how often the system made an error determining the particular word based on processing during some training activity, computed a-priori Other word data value features may also be determined in addition to, or instead of, the above word feature values. Various combinations of word feature values are possible. Whatever word features are used, the values for those word features may be combined into a feature vector where each word has a feature vector including data corresponding to the feature categories. The function $f_w(w_n)$ may be defined as the mapping of frame $w_n$ (i.e., word n) to its feature vector. As shown in FIG. 11C, a particular word $w_n$ may be associated with a variety of feature data values 1170a through 1170z. That data, along with feature vector $y_{word-n}$ 1132n representing the data about the word's phones, may be processed by a feature vector mapper 1172 to determine the word feature vector 1104 corresponding to word $w_n$. Thus feature vector 1104 is based on data describing characteristics of word $w_n$, as well as based on data describing characteristic of phone $p_{nm}$ (and based on data describing frames $p_{n1}$ through $p_{nM}$) as well as based on data describing characteristics of frame $f_{nml}$ (and based on data describing frames $f_{nm1}$ through $f_{nmL}$). Similar feature vectors may be determined for other words, resulting in, for example, word feature vector 1102 for word $w_1$ through feature vector 1106 for word $w_N$.

For a sentence (i.e., the entire word sequence selected as the top scoring result from the ASR process, be it a complete sentence or not), an RNN encoder E may be used to map the sequence of feature vectors for each word corresponding to the particular sentence (i.e., for feature vector $w_1$ through feature vector $w_N$) into a fixed sized feature vector $y_{sentence}$ as follows. Such a mapping may be expressed as follows: $y_{sentence}=E_s(f_w(w_1) \ldots (w_N))$. Thus, as shown in FIG. 11C, encoder $E_s$ 1174 may encode word feature vectors 1102 through 1106 into feature vector $y_{sentence}$ 1134. Thus feature vector 1134 is based on data describing characteristics of the sentence/word sequence, as well as based on data describing characteristics of word $w_n$ (and based on data describing frames $w_1$ through $w_N$), as well as based on data describing characteristic of phone $p_{nm}$ (and based on data describing frames $p_{n1}$ through $p_{nM}$) as well as based on data describing characteristics of frame $f_{nml}$ (and based on data describing frames through $f_{nmL}$). The data describing characteristics of the sentence/word sequence may include the sentence/word sequence duration (in time or number of audio frames), the number of words in the sentence/word sequence, or other characteristics. Thus, the entire sentence may be represented as the encoded feature vectors of all the words of the sentence, where each word is represented as the encoded feature vectors of each phone of the word, where each phone is represented as the encoded feature vectors of each frame of the phone. Thus, the sentence is represented as a fixed size feature vector that was determined using the hierarchical encoding described above. The size of the feature vectors output by a particular encoder will be the same (e.g., all feature vectors output by encoder $E_s$ 1174 will have the same size) but the size of feature vectors output by different encoders may be different sizes (e.g., feature vectors output by encoder $E_s$ 1174 may be of a different size from feature vectors output by encoder 1164).

To confirm whether a sentence is correct, the final set of hierarchical features may be input into and classified by a DNN following the encoder/classifier approach. The regression model may be represented as:

$$p(\text{sentence is correct}|w_1, \ldots w_N) := \\ G(c=\text{True}|f_s(w_1, \ldots w_N)) => [0,1] \quad (2)$$

where G is the two-class DNN predicting the probability of $w_1, \ldots w_N$ being correct.

The DNN may output a yes/no indication (illustrated in equation (2) as [0,1] thus classifying the sentence as correct or incorrect. The DNN may also output a probability, which may be used as a confidence of the sentence being correct. Thus, as illustrated in FIG. 12, the feature vector $y_{sentence}$ 1134 may be input into trained classifier G 1202, which will then output a confirmation 1206 that that the sentence/ASR result is correct or incorrect and/or may output a confidence score 1204 indicating the classifier's confidence of the correctness of the sentence. If the confidence score 1204 exceeds a threshold, the system may determine that the sentence is correct. The classifier G 1202 may be trained together at the same time as the individual encoders $E_p$ 1154, $E_w$ 1164, and/or $E_s$ 1174. Known machine learning techniques may be used to train the classifier and encoder(s), for example using a gradient feedback technique to update parameters/weights in the classifier and encoder(s). The classifier and encoder(s) may be trained using training samples of acoustic data with the annotated correct word sequence. The classifier G 1202 may also be trained on (and process during runtime) additional inputs such as meta information regarding an utterance (e.g., time data, date data, location data, etc.), user context information (e.g., user identity, age, interaction history, etc.) or other types of data. This approach may be used for word or sentence confidence estimation in a large-vocabulary-continuous-speech-recognition (LVCSR) system. For determining whether a sentence ASR output is correct, G may be trained from examples of a training set of decoding results, which are manually labeled as correct or incorrect.

As noted above, this approach may be used to confirm a word sequence ASR result or may be used to confirm a single word ASR result, such as in the case of identifying a keyword or keyphrase spotter, for example in detecting a wakeword described above. Such a keyword spotting system may consist of two stages, in the first stage a simplified HMM decoder may be applied consisting of a model of the keyword (or keyphrase) and a background model. The background model may be anything from a single state model, over a phone based model, to a full word based model. If the first stage detects a potential keyword (or keyphrase), then the classifier 1202 may output a confidence score. If the confidence score exceeds a given threshold, then the keyword (or keyphrase) is accepted. For determining whether a word level ASR output is correct (such as in the situation of checking wakeword detection), then G may be trained on words instead of sentences. In the context of wakeword confirmation, if a wakeword is confirmed, the server 120 may send a message to the local device 110 to continue sending audio data for further ASR processing or may then (after confirming the wakeword) process further audio data received from the local device 110. If the wakeword is not confirmed, the server 120 may send a message to the local device 110 to discontinue sending further audio data or may simply discard further audio data received from the local device 110.

Supplementing System Knowledge Using Unstructured Text

If a query answering system cannot determine an answer to a user's question using a structured and reliable knowledge base 272, the system may rely on a web search to respond to the query. While providing a query answer from a web search may be less reliable than providing an answer from a curated knowledge base 272, in certain instances providing a potentially unreliable answer may be preferable to providing no answer at all.

Using the above ASR confidence measuring technique (and other techniques), however, various operations may be performed to determine that certain answers obtained from web searches (or other searches) are more reliable. Thus, the system may learn new facts based on unstructured text that is obtained from web searches. Those new facts may then be stored for later use, ether in the knowledge base 272 or in some other data store 190. To provide some check on whether the data from the unstructured text is responsive to the original user's spoken query, the system may make certain checks regarding ASR confidence and semantic parsing (e.g., as indicated by a question being a rephrase of a previous question) prior to using the unstructured text to populate a data store. This process is discussed in detail below.

Figure 13A:
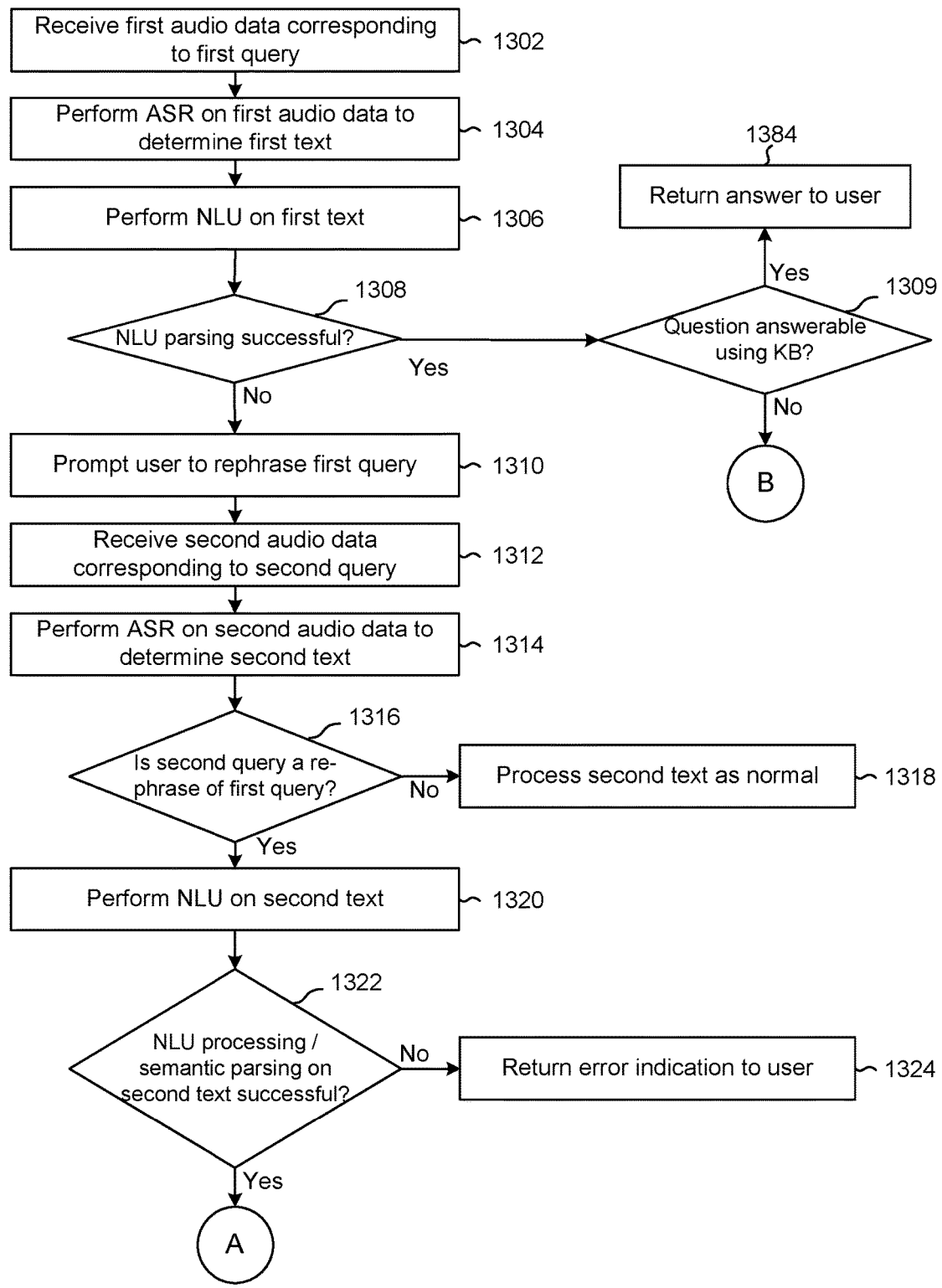
FIGS. 13A-13C are flow charts illustrating query answering and data supplementation according to embodiments of the present disclosure.

First, the system may perform operations on an incoming query to determine if it is a rephrased version of a previously received query. Starting with FIG. 13A, a server may receive (1302) first audio data corresponding to a first query. The system may perform (1304) ASR processing on the first audio data to determine first text. The system may then perform (1306) NLU processing, for example semantic parsing (such as entity tagging, NER, etc.) on the first text. The semantic parsing may include an attempt to process the second text to identify the information requested in the query. For example, semantic parsing may include identifying a particular subject-relation-object triple where some piece of information is missing from the triple, and that piece of information is the request of the query. For example, if a user asks "where was President Obama born?" the resulting triple may be [President Obama, (BORN IN), X] where President Obama is the subject, (BORN IN) is the relation and "X" is the object and desired answer of the query. The desired information "X" may also be the subject or the relation, depending on the phrasing of the particular query. Other types of queries (i.e., not involving triples) are also possible. If the system is able to semantically parse the first text (1308:Yes) the system may attempt to answer the first query as normal. For example, if the question is answerable using the knowledge base (1309:Yes) the system may return an answer to the user (1384), or if the question is not-answerable using the knowledge base (1309:No), the system may return an error to the user or may attempt to answer the question using rephrased queries as discussed below in reference to FIG. 13C. If, however, the system determines that the NLU processing/semantic parsing of the first text failed (1308:No), the system may then prompt (1310) the user to rephrase the first query. For example, the system may choose from a preconfigured set of prompt texts, perform text-to-speech (TTS) processing on the prompt text to determine synthesized speech audio output data and send the audio output data to the local device from which the server received the first audio data. The text may include phrases such as "I don't understand the question. Can you please re-phrase it and ask it again?" or "Sorry, I think I misunderstood you. Can you try to repeat the question?" or other phrasings. Selection of the prompt text may be based on ASR confidence (for example, confidence score 1204) where high ASR confidence may result in the prompt text focusing on the phrasing of the question (to hopefully improve semantic parsing) whereas low ASR confidence may result in the prompt text focusing on the user's utterance and clarity of the receiving sound.

The system may then receive (1312) second audio data corresponding to a second query. The system may determine that the second query came from the first user as the first query, either by determining that the second audio data was received from the same device that sent the first audio data, or in another way, such as receiving the second audio data from a device linked to the device that sent the first audio data, for example where both devices are linked to a single user account in user profile storage 1702 (discussed below). The system may perform (1314) ASR processing on the second audio data to determine second text.

Figure 14:
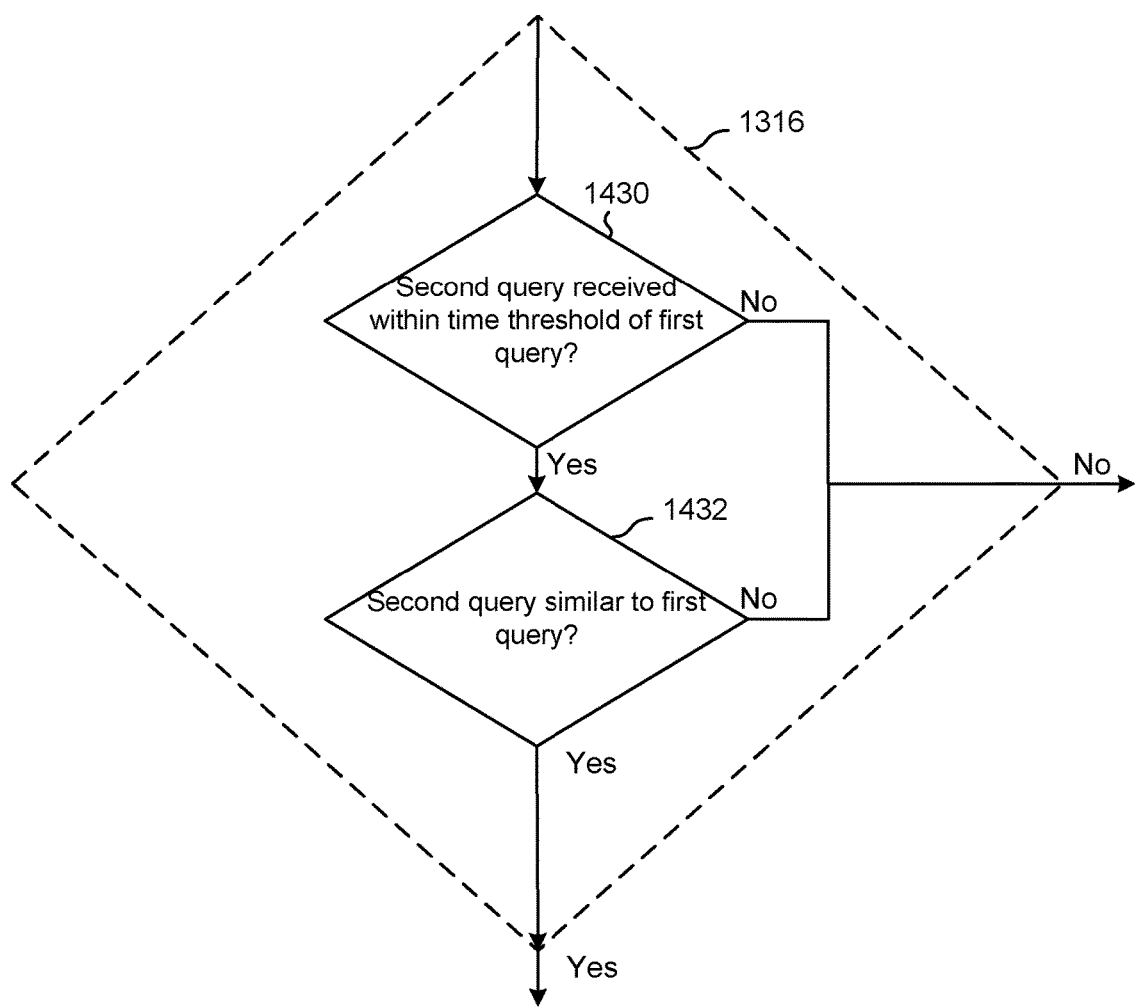
FIG. 14 illustrates determining if a second query is a rephrase of a first query according to embodiments of the present disclosure.

The system may then check (1316) to see if the second query is a rephrase of the first query. A number of techniques may be used to determine if the second query is a rephrase of the first query. In one example, illustrated in FIG. 14, a second query may be considered to be a rephrase of a first query if the second query (i.e., second audio data) is received within a time threshold of the first query (1430:Yes) and if the second query is similar to the first query (1432:Yes). Other techniques may also be used to determine if the second query is a rephrase of the first query.

Figure 15A:
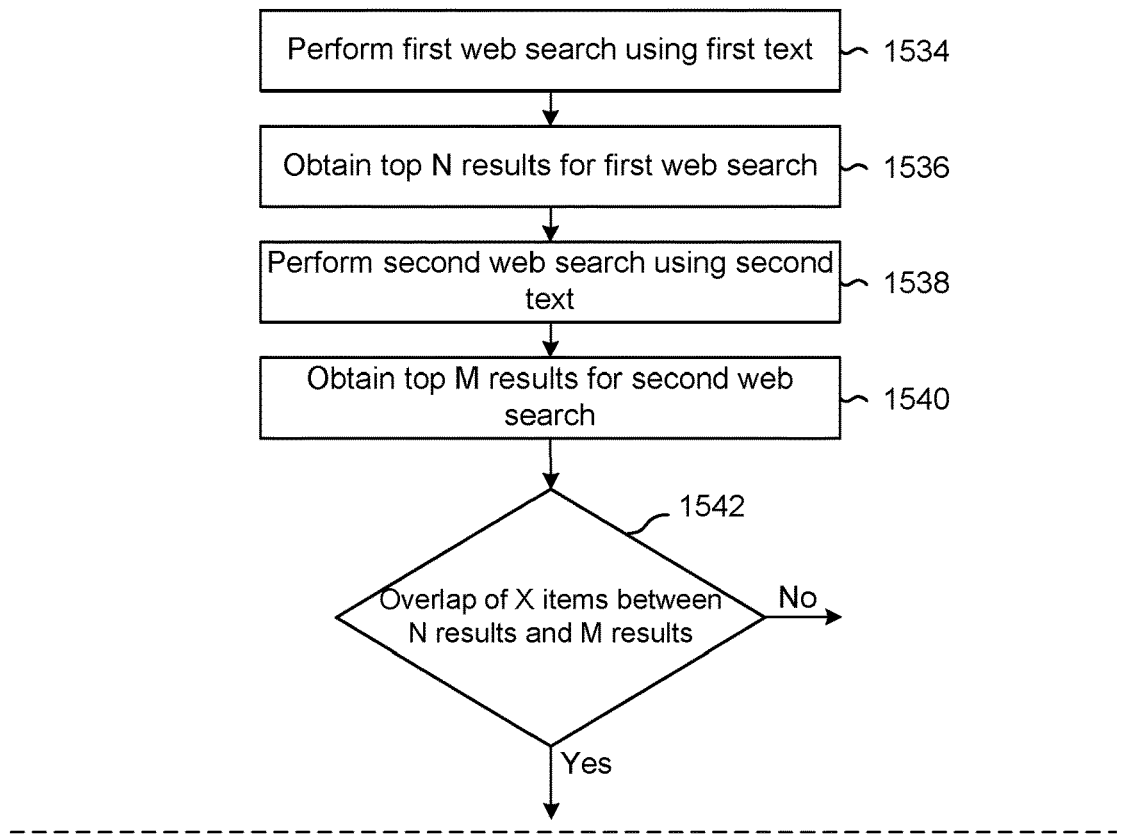
FIGS. 15A-15B illustrates determining if a second query is similar to a first query according to embodiments of the present disclosure.

Similarity between queries may also be determined in a number of ways. In one example, illustrated as technique 1 in FIG. 15A, the system may perform (1534) a first web search using the first text (which resulted from ASR processing of the audio data of the first query). That is, the system may use all or a portion of the first text as an input to a search engine such as A9, Google, Bing, etc. The system may then determine (1536) the top N results from the first web search. E.g., the system may note the top 10 links offered in the search results. The system may then perform (1538) a second web search using the second text (which resulted from ASR processing of the audio data of the second query). That is, the system may use all or a portion of the second text as an input to a search engine. The system may then determine (1540) the top M results from the second web search. M may be the same as N (e.g., the top 10 results) or may be different. The system may then check (1542) if there is an overlap of at least X items between the top N results from the first web search and the top M results from the second web search. For example, the system may determine if at least 5 of the top 10 links returned by the first web search overlap with at least 5 of the top 10 links returned by the second web search. (Values for N, M, and X are configurable.) If so (1542:Yes) the system may determine that the first query is similar to the first query (1532: Yes). If not, (1542:No) the system may determine that the first query is not similar to the first query (1532:No).

Figure 15B:
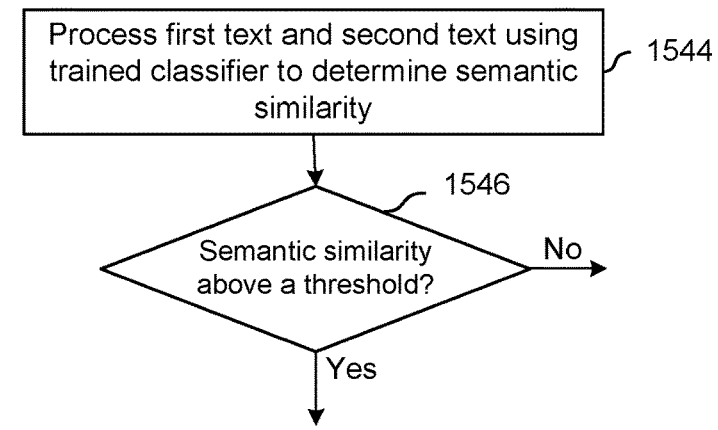

In another example, illustrated by technique 2 in FIG. 15B, the system may process (1544) first text and second text using a machine-leaning trained classifier to determine semantic similarity. If the classifier determines that the first text and second text are similar beyond a threshold confidence (1546:Yes) the system may determine that the first query is similar to the first query (1332:Yes). If not, (1546: No) the system may determine that the first query is not similar to the first query (1332:No). The classifier used to determine text similarity (1546) may be trained using a training data set including positive examples (i.e., data including sets of pairs of different formulations of the same question) and negative examples (i.e., data including sets of pairs of different questions). The encoding techniques described above may be used to train the similarity classifier. The classifier may be symmetrically trained, in that it is trained using positive and negative examples where the question pairs appear twice, in different orders. Thus the order of input of the first text or second text into the should not matter when the classifier is operated at runtime to determine (1546) if the first text is similar to the second text. Technique 1 may be combined with technique 2, for example where a combination of overlap items and similarity score result in the queries being declared similar. Other techniques may also be used for determining if the first query is similar to the second query. The determinations of whether the second query is a rephrase of the first query (1316) or whether the second query is similar to the first query (1432) may be performed even if the system is not able to semantically parse the first text and/or the second text. That is, the system may determine whether the first query is similar to the second query independent of whether the system can semantically parse the respective text of the queries.

Returning to FIG. 13A, if the second query is not a rephrase of the first query (1316:No), the second query is processed (1318) by the system normally as a stand-alone query. If the system, however, determines that the second query is a rephrase of the first query (1316:Yes) the system may perform (1320) NLU processing on the second text in an attempt to obtain a semantic parsing of the second text. The semantic parsing of the second text may include attempting to identify a subject-relation-object (SRO) triple. If the semantic parsing of the second text is unsuccessful (1322:No) the system may return (1324) an error indication to the user. The error indication may be selected along the lines of the prompt discussed above with step 1310. Though if the questions are similar, the system may select prompt text for TTS output that acknowledges the rephrased nature of the second query. For example, the system may output, "I am sorry, but I still don't understand the question" or "I still can't figure out what you are asking." Selection of the prompt may also depend on ASR confidence (1204) of the corresponding to the first text or second text, for example "I had trouble hearing you both times, please ask your question again when there is less noise" or "Your most recent question sounded better but I still can't understand what you need." Thus the system may select a prompt in attempt to get the user to respond by correcting the problem the system is encountering in understanding the query (i.e., get the user to improve the audio quality, try a rephrasing of the question, etc.) The system may then attempt a further re-prompt (which may cause the system to loop the process of FIG. 13A) or may end the interaction with the user for this query and start anew.

Figure 13B:
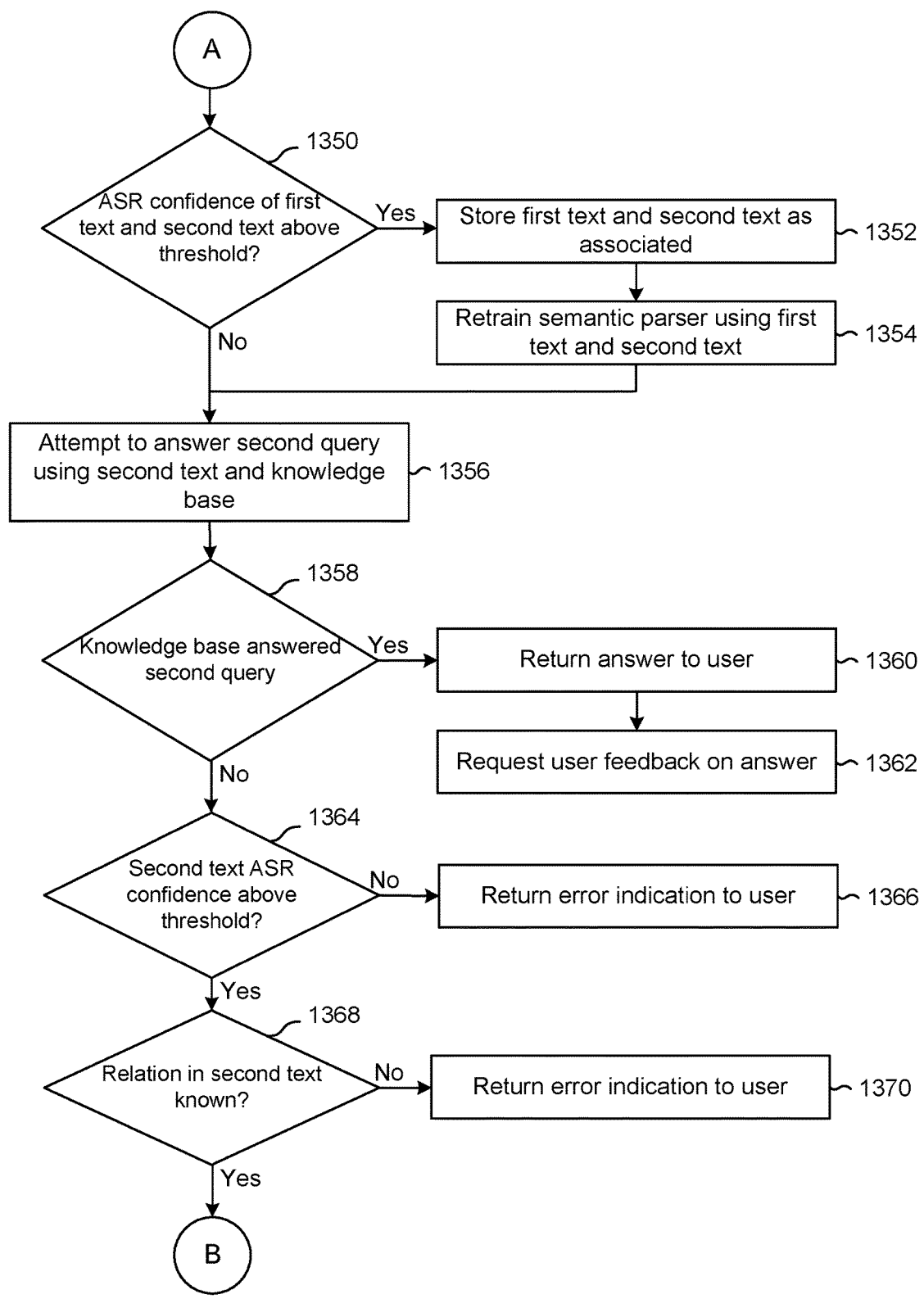
Figure 16:
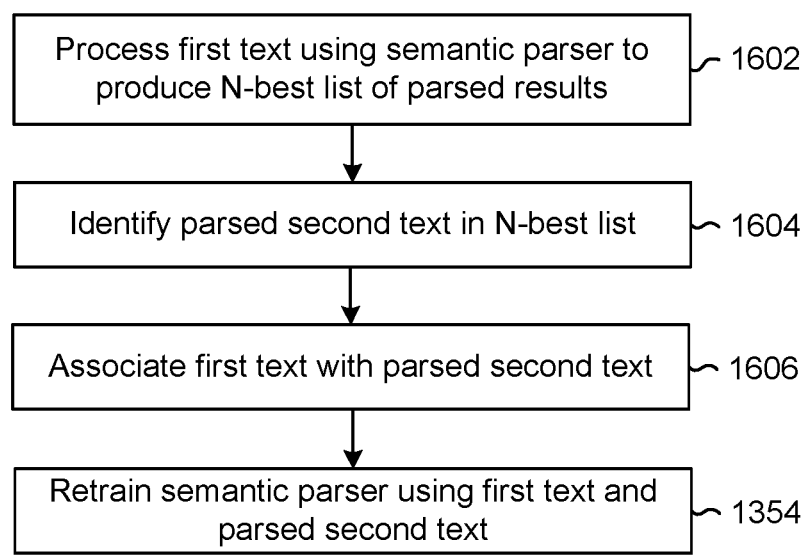
FIG. 16 illustrates retraining a semantic parser according to embodiments of the present disclosure.

If the system is able to successfully semantically parse the second text (1322:Yes) the system may continue processing as illustrated in FIG. 13B. The system determines (1350) if the ASR confidence of the first text and the ASR confidence of the second text are above a threshold. The system may use the respective confidence scores 1204 or the respective confirmation 1206 of each ASR processing to make the determination 1350. If the confidences are sufficiently high, the system may associate and store (1352) the first text and the second text and may, during a training phase, retrain (1354) a semantic parser using the first text and second text, as explained below in reference to FIG. 16. This retraining is made possible due to the system's understanding that the first text and second text are related as determined above. Continuing on for the runtime processing, the system may attempt (1356) to answer the second query using the second text and the knowledge base. That is, the system may construct a request to the knowledge base using semantically parsed information from the second text.

If the knowledge base is able to answer the second query (1358:Yes) the system returns (1360) the answer to the user. For example, the system takes answer data from the knowledge base, reformats it with additional text in a manner that answers the user's question, performs TTS on the reformatted text, and sends the resulting synthesized speech audio data to the user's device for playback. The system may also request (1362) and process user feedback on the provided answer. For example, if an ASR confidence of the second text was low or at a certain percentage (even if the system was able to successfully answer the second query) the system may prompt the user and ask "did the response answer your question?" or some similar feedback request. If the user answers "yes," the second text and its corresponding parsing result may be stored and saved as a positive example for retraining the semantic parser (similar to how the parser may be retrained with the first and second text mentioned above in reference to 1354 and further detailed below in reference to FIG. 16). If the user answers "no" to the feedback prompt (which would mean that the system was able to find an answer to the query but the answer was either incorrect or the system did not accurately determine what question the user intended to ask), the second audio data, second text, and/or semantic parsing of the second text may be stored and added to a list for manual transcription (i.e., human error correction to determine what caused the error). If the user answers "no" to the feedback prompt but the ASR confidence 1204 is high (or confirmation 1206 is yes) then the system knows that the ASR results were correct but the semantic parse was in error. The system may then save the second text and its corresponding parsing result as a negative example for retraining the semantic parser. (The system may also be configured to analyze the user's response to the voice prompt to detect audio qualities such as tone, pitch, etc. corresponding to an ironic or sarcastic remark so that a response to the feedback is interpreted properly by the system.)

If the system is unable to answer the second query using the knowledge base (1358:No) the system may check to see if the ASR confidence (1204) of the second text is above a threshold (or if confirmation 1206 for the second text is yes). If the ASR confidence is low (1364:No) the system may return (1366) an error indication to the user (for example, "I'm sorry, I am having a hard time understanding your question.") and discard the second text. This is because in this situation, the system is unsure that it properly understood the user's question and thus the question pair is undesirable in terms of adding to the system's stored knowledge (either in the knowledge base 272 or in the data store 190). Further, it may be desirable to return an error message rather than attempt to answer an incorrectly understood question.

If the ASR confidence is high (1364:Yes) the system may consider attempting to answer the second query using a web search or other means. First, the system may determine if the relation in the second text is known (1368). The relation is the linking of the subject and object in the query. Examples of queries where the relation is known include "where was Barack Obama born," "who is Tom Cruise married to" or "what is the capital of North Dakota" where the respective relations are [born in], [married to] and [capital of]. Determination of whether the relation is known may be performed by the NLU processing/semantic parsing of the second text. If the relation is known, the system may be able to determine the subject/object that is being asked for, whereas if the relation is unknown, the system may have difficulty identifying what is being asked by the question. Thus, if the relation in the second text is unknown (1386:No), the system may return (1370) an error indication to the user and discard the second text.

Figure 13C:
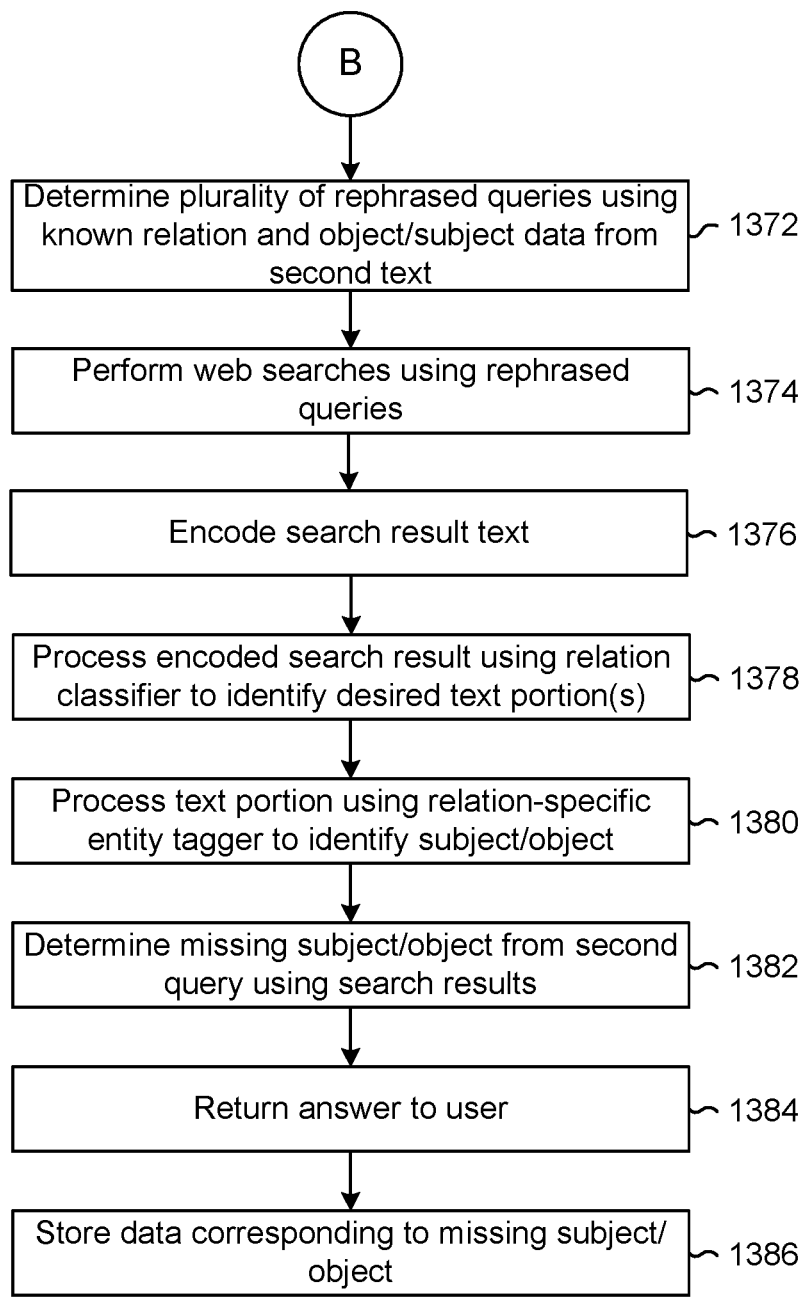

If the relation is known (1368:Yes), however, the system has determined enough information about the second query (it is similar to the first query, the relation is known, and the ASR confidence is sufficiently high) to attempt to answer the second query using other means and to store the resulting answer (for example in the data store 190) for use in further queries. As shown in FIG. 13C, if the relation is known the system may determine (1372) a plurality of rephrased questions using the known relation and object/subject data from the second text. For each known relation (of which there may be thousands), the system may have stored various examples of forms of questions asked using that relation (or may have a trained machine learning model capable of constructing such rephrasings). For example, if query text includes "where was Obama born," the system may determine that the relation is [born in] and that rephrased queries may include "Obama was born where," "Obama's birthplace is what," or the like. The system may also be capable of performing NER for any subjects/objects named in the query text and may use different versions of the entity name in the rephrased query (for example "where was President Obama born"). The system may then take the text of the individual rephrasings and perform (1374) a web search for each rephrased query or from the original first query text. That is, the text of each individual rephrasing is run through a search engine to find results (for example from data source(s) 180) for each query and the system attempts to identify the missing subject or object from the unstructured text of the web searches.

The unstructured search results may come in a variety of forms, but typically will be in the form of a web page with a varying amount of text, only some of which may be relevant to the second query (or the particular rephrasing thereof). Thus, while the individual search result may include relevant information, the system needs to identify the relevant information in the unstructured text of the search results. To identify the relevant information, the system may use one or more trained machine learning classifier(s) that can identify when text refers to a specific relation. Such a relation classifier (RC) may be specific to a relation (i.e., a binary classifier that is only configured to determine whether or not text corresponds to that specific relation). Thus, the system may have available to it a different RC for [born in], a different RC for [married to], a different RC for [capital of], and so on. Thus the system may process incoming text with multiple RCs prior to identifying the corresponding relation. Alternatively, the RC may be a multi-class classifier capable of sorting text into the particular relation of the text (or to no relation at all). Text for a search result may be encoded (1376) (for example using an RNN Encoder 950) to create an encoded feature vector 910 representing the text of the search result. For example, an encoder 950 may be used to encode each sentence of a search result into a feature vector. The RC may then process (1378) each feature vector to determine whether the particular sentence includes the desired relation. Each sentence that includes the desired relation may be considered a desired text portion. Processing by the RC may result in an output indication that the text corresponds to a particular relation or may output a score indicating whether the text corresponds to a particular relation. For example, processing by the RC may output a first score indicating whether a first text corresponds to a first relation and a second score indicating whether the first text corresponds to a second relation. If either of the scores are above a threshold, the system may note that the first text corresponds to the respective relation for the above-threshold score. Note that certain text portions may include text correspond to multiple relations, particularly for longer segments of text.

The RC may be trained on a large training set of example sentences including the desired relation. For example, for an RC configured to identify a first relation in text, the system may compile a plurality of sentences with examples of phrasings of text using the [first relation]. Certain examples may be constructed using the knowledge base. For example, known (subject, [first relation], object) tuples in the knowledge base may be used to construct a set of training examples as a list of quadruples (subject, [first relation], object, sentence text). Example sentences may also be obtained from other sources. Many different phrasings of questions including the relation can be used to provide robust training for the RC. The sentence text may then be prepared for the encoder 950 by augmenting with other features that may be useful in identifying the relation. For example, a proper noun tagger may tag entities in a sentence and link them to a known entity in the knowledge base (i.e., linking instances of "Obama," "Barack Obama," "President Obama," or the like to the specific entity identifier in the knowledge base linked to President Obama). Proper nouns in the sentence may also be tagged with entity types (e.g., is_city, is firstname, is_male_name, etc.). Other feature data may also be determined for the example sentence. The feature data of the sentence (which includes the sentence text) may be input into the encoder 950 and processed into a feature vector corresponding to the sentence. The specific sentence feature vectors may also be labeled as including the desired relation (positive examples) or not including the specific relation (negative examples). The system may then train the RC for the relation using the sentence feature vectors and ground truth labels using an encoder/classifier approach. The approach may result in a classifier that can identify, using an encoded feature vector for an incoming sentence, whether the sentence includes the desired relation. The RNN encoder used to encode the sentence and classifier (RC) used to determine whether the particular sentence includes the desired relation may be jointly trained using techniques described above in relation to FIG. 9. As noted above, an individual RC may be trained for each relation, or a multi-class RC may be trained to identify what relation an incoming sentence may include. Thus, at runtime, the system may identify the relation in the second query (for example in step 1368) and may identify the RC corresponding to that relation (for example, using a relation reference ID) for use in processing the encoded search results in step 1378.

At runtime, the encoded feature vector 910 created from obtained text may include data corresponding to the types of data used during training. For example, the encoded feature vector may include data representing various characteristics of the text, such as the identity of words included in the text, word pairs, word embeddings, word dependency data, word order data, or other data that may be used to determine whether the text includes a particular relation, what text can be identified as a subject/object of the relation, or the like. Many data types may be included in the encoded feature vector and the specific types of data are configurable.

Once the desired text portions (i.e., sentences including the desired relation) are identified (1378) from the search results, the system may process (1380) those text portions using a relation-specific entity tagger to identify the subjects/objects corresponding to the relation in the individual text portions. The entity tagger (which may be a machine learning trained classifier or other machine learning model) is model configured to identify, in query text, text portion(s) (i.e., word strings) that correspond to a subject or object for the particular relation. As can be appreciated, each relation-specific entity tagger may be trained on data related to that specific relation and is configured to identify entity subjects/objects for that sentences including the desired relation. For example, if a first relation is a capital city, a relation-specific entity tagger may be configured to recognize, using incoming query text (and features based on that incoming query text) the country, state, or other geographic entity whose capital is being sought in the query (or, inversely the capital city of the country, state, or other geographic entity that is being sought in the query). The training data used to train the relation-specific entity tagger may include many different formulations and ways of asking for the subject/object of the relation. Further, training of a relation-specific entity tagger may involve both positive and negative examples. The relation-specific entity tagger may be a classifier configured to take as input text as well as other information (in various forms) that may characterize or describe the text.

Thus, for incoming text from a web search, the system may take the relation identified earlier (e.g., in step 1368), select an RC corresponding to that relation, use the RC on encoded search results (1378) to identify desired text portions (e.g., a sentence), then process (1380) those text portions using the entity tagger for the known relation to identify the subject/object corresponding to that relation in the text portions. The entity tagger may be a trained classifier that can operate on an encoded feature vector corresponding to the sentence. For example, an RNN encoder may be configured to operate on the sentence text to create an encoded feature vector that may be processed by the entity tagger classifier to identify the text portion(s) of the sentence corresponding to the entity/entities. The system may then determine (1382) the missing subject/object from the second query using the results from step 1380. For example, the system may compare the result of step 1380 and select the subject/object that appears most often in the text portions or may select the subject/object that has a high confidence score resulting from the relation-specific entity tagger (either from an individual confidence score or from an aggregate confidence score across processed desired text portion samples). The system may also run further checks on the determined subject/object, for example checking a closed world assumption, relation-specific consistency checks, or the like.

As an alternative to training the RC classifier and entity tagger separately, various combined training may be possible, for example training and using a global classifier that identifies subjects, objects, and potential relations. Other such variations of trained models may also be used.

Once the desired subject/object is determined (1382) (i.e., the information sought in the query has been identified), the system may formulate an answer using the desired subject/object and return (1384) the answer to the user. Doing so may include formulating answer text, performing TTS on the answer text and sending output audio data including synthesized speech to a user device 110 for playback. The system may also return to the user some indication that the answer was machine generated, or found using an unverified source (as opposed to the knowledge base). For example, the system may return voice audio such as "I performed a web search and found out that _____." The system may also send additional information to a companion device that includes further information on the source of the answer. The system may also request and process user feedback as discussed above in reference to step 1362. If the system cannot determine the desired subject/object, it may return an error indication to the user.

If successfully found, however, the determined subject/object may also be stored (1386) by the system along with the second text, an indication of the relation of the second query, etc. For example, association data may be stored associating the subject/object, relation, and second text. For example, an index entry may be created in an index of a data store 190 that includes the subject, object, relation and second text (e.g., sentence that includes text describing the relation). Other examples of association data may also be used. That association data may be used to add to a data store 190 or knowledge base. For example, the determined subject may be stored in a triple (subject, relation, object) or other quadruple (subject, relation, object, sentence text) form in the data store 190. The stored fact may also be labeled with some indication that the fact was obtained from unstructured text and has not been verified. Thus, if a future query is answerable using the stored fact, the system may advise the user that the fact is unverified. Later processing may be performed to verify the fact and store the fact in the knowledge base. Alternatively, the fact may be stored without verification. As can be appreciated, adding a fact to the data store 190/knowledge base using the processes described above (which may involve some check on ASR processing and semantic processing) may be performed without human intervention, i.e. by a system using trained machine learning models and various other computing activities that do not require human intervention. Thus, the system may add facts to a data store 190 in a manner that is more efficient that systems that require human intervention and is more accurate than systems that do not involve the ASR/semantic parsing checking presented here. While human annotation/confirmation may eventually be employed, the processes discussed herein provide a more reliable method of computer-processed facts for inclusion in a data store/knowledge base. The association data may include an indication that the association data was machine generated or otherwise includes unverified data. This indication may be used to generate a notification to a user that data created from the stored association may be unverified, machine generated, or otherwise not as reliable as verified data obtained from a knowledge base.

At some training time after the second query was processed, the system may take the stored first text, second text, determined relation, determined subject/object, and whatever additional data that was stored (1352, 1386) had from the runtime processing to retrain (1354) the semantic parser to improve future results. In particular, the system may know that the second query was a rephrase of the first query and that the system accurately parsed the second query to obtain an answer for the user. The system may use this information to improve future processing. In particular, when the second query is a rephrase of the first query and the ASR confidence of both the first text and the second text was high, the system may perform the steps illustrated in FIG. 16. First, the system may process (1602) the first text using the semantic parser (e.g., a parser included as part of NLU module 260) to obtain an N-best list of parsed results. The system may then either process the second text using the semantic parser to obtain parsed second text or may obtain the parsed second text from storage, as the parsed second text may have been saved from the runtime processing. The system may then identify (1604) the entry in the N-best list that matches the parsed second text (i.e., where the two are either identical or semantically similar). The system may then associate (1606) the first text with the parsed second text and may retrain (1354) the semantic parser using the first text and the parsed second text. That is, the pairing of the first text and the parsed second text may be added as a positive training example (potentially with other examples) and used to retrain the semantic parser. Thus the system may teach the semantic parser that the parsed second text (or semantic equivalent thereof) is actually the correct answer for the first text, thus should have appeared higher in the N-best list rankings (which in turn would have satisfied the user's initial query without a rephrase). Thus, following the retraining, the semantic parser may be improved to more accurately parse initial queries.

Figure 17:
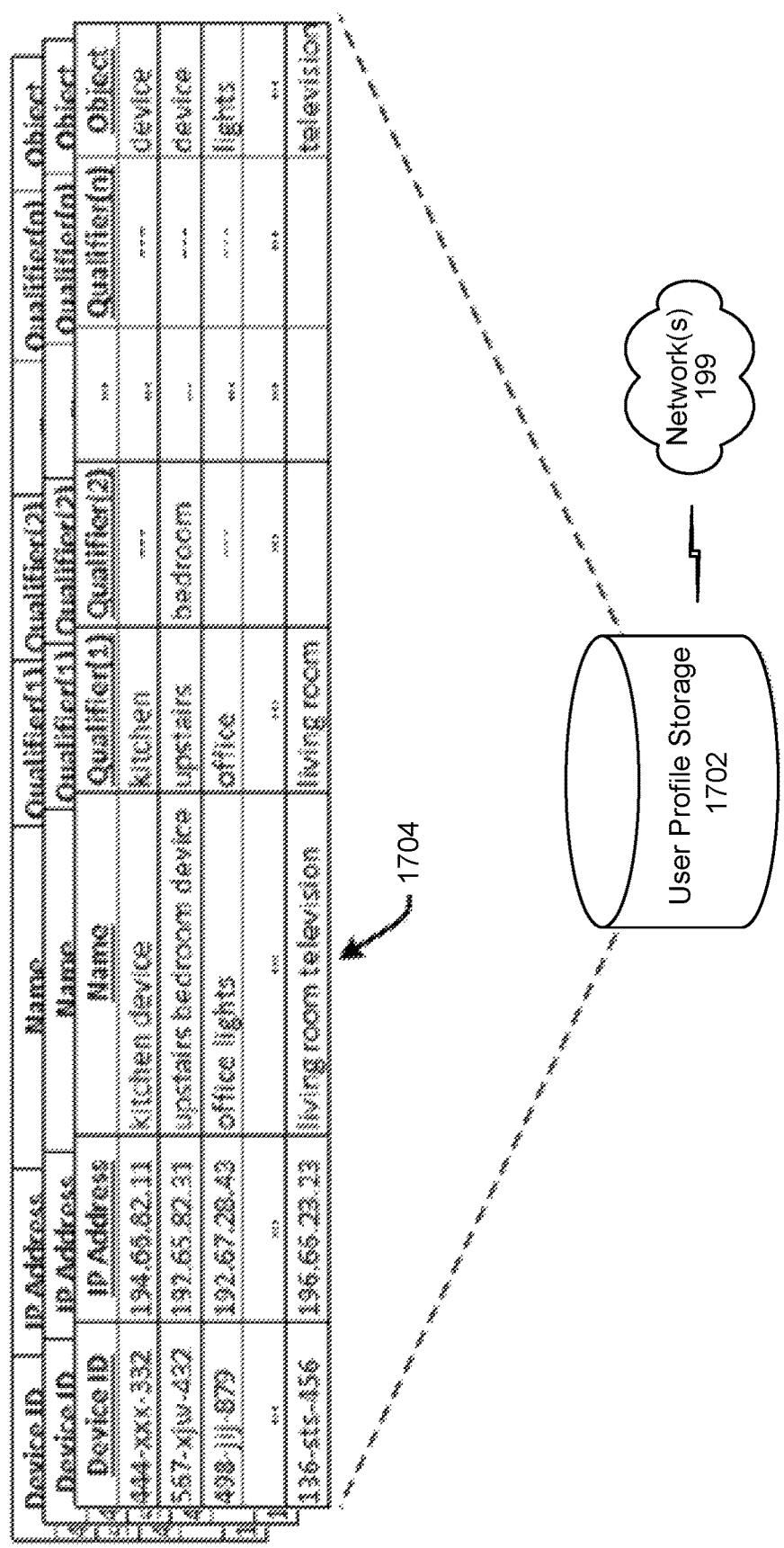
FIG. 17 illustrates data stored and associated with user profiles according to embodiments of the present disclosure.

The server 120 may include or reference data regarding user accounts, shown by the user profile storage 1702 illustrated in FIG. 17. The user profile storage may be located proximate to server 120, or may otherwise be in communication with various components, for example over network 165. The user profile storage 1702 may include a variety of information related to individual users, households, accounts, etc. that interact with the system 100. For illustration, as shown in FIG. 17, the user profile storage 1702 may include data regarding the devices associated with particular individual user accounts 1704. In an example, the user profile storage 1702 is a cloud-based storage. Such data may include device identifier (ID) and internet protocol (IP) address information for different devices as well as names by which the devices may be referred to by a user. Further qualifiers describing the devices may also be listed along with a description of the type of object of the device. For example, user preferences regarding commands can be stored by the server 120. Such user preferences can be used by the server 120 to answer queries as described herein.

Figure 18:
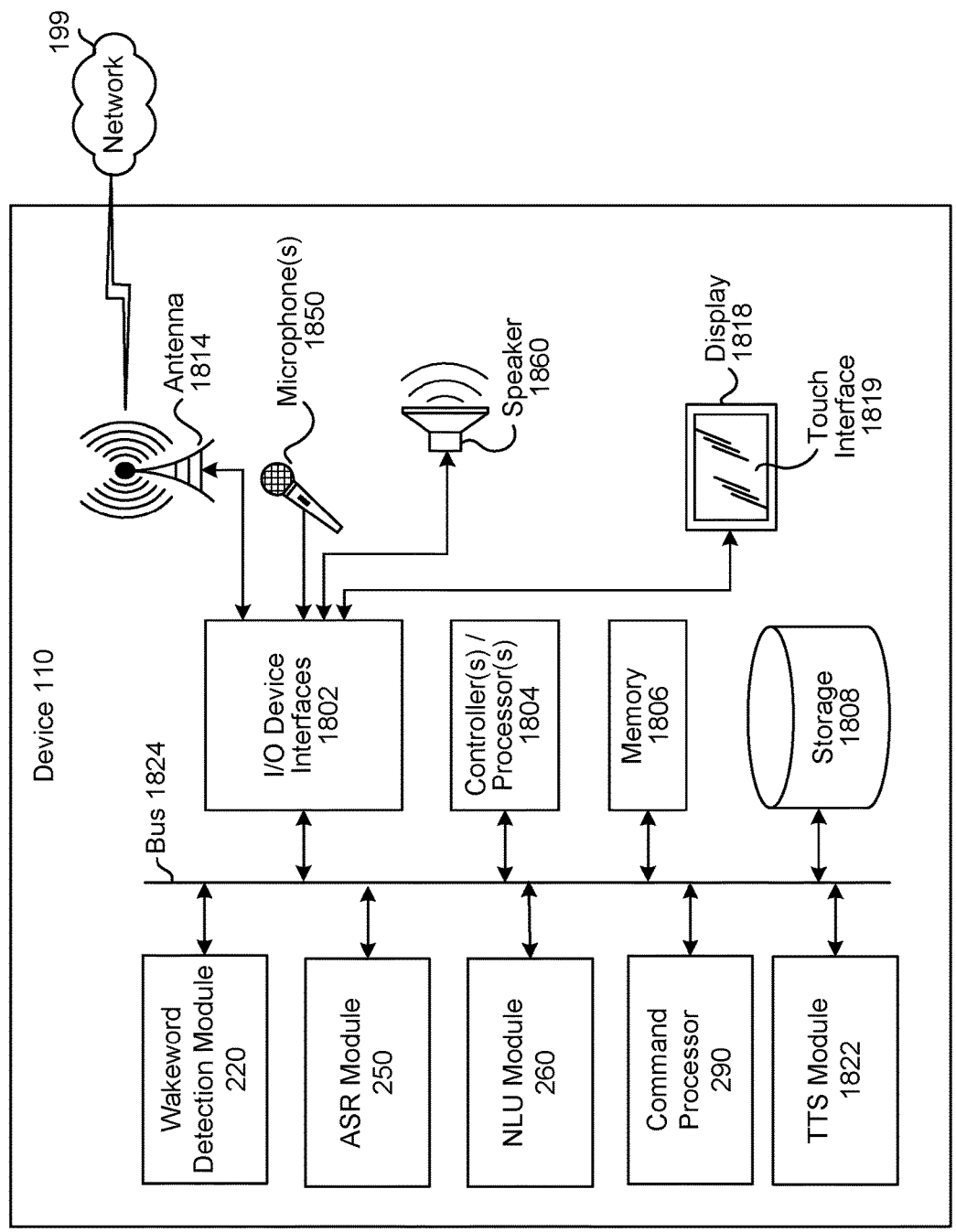
FIG. 18 is a block diagram conceptually illustrating example components of a device according to embodiments of the present disclosure.
Figure 19:
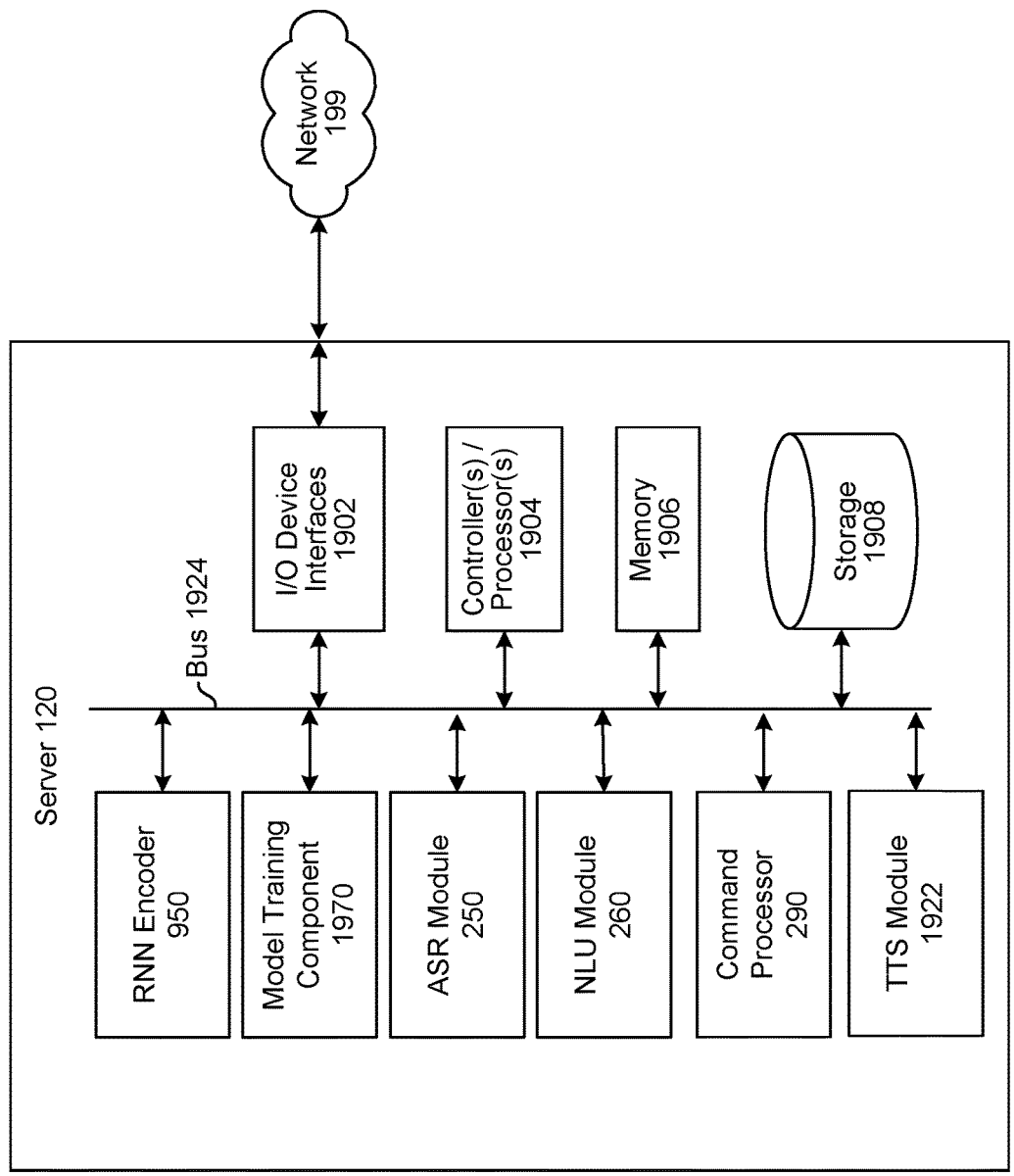
FIG. 19 is a block diagram conceptually illustrating example components of a server according to embodiments of the present disclosure.

FIG. 18 is a block diagram conceptually illustrating a local device 110 that may be used with the described system. FIG. 19 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1804/1904), that may each include a central processing unit (CPU) for processing data and computer-readable instructions, and a memory (1806/1906) for storing data and instructions of the respective device. The memories (1806/1906) may individually include volatile random access memory (RAM), non-volatile read only memory (ROM), non-volatile magnetoresistive (MRAM) and/or other types of memory. Each device may also include a data storage component (1808/1908), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1802/1902).

Computer instructions for operating each device (110/120) and its various components may be executed by the respective device's controller(s)/processor(s) (1804/1904), using the memory (1806/1906) as temporary "working" storage at runtime. A device's computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each device (110/120) includes input/output device interfaces (1802/1902). A variety of components may be connected through the input/output device interfaces, as will be discussed further below. Additionally, each device (110/120) may include an address/data bus (1824/1924) for conveying data among components of the respective device. Each component within a device (110/120) may also be directly connected to other components in addition to (or instead of) being connected to other components across the bus (1824/1924).

Referring to the device 110 of FIG. 18, the device 110 may include a display 1818, which may comprise a touch interface 1819. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1802 that connect to a variety of components such as an audio output component such as a speaker 1860, a wired headset or a wireless headset (not illustrated) or other component capable of outputting audio. The device 110 may also include an audio capture component. The audio capture component may be, for example, a microphone 1850 or array of microphones, a wired headset or a wireless headset (not illustrated), etc. The microphone 1850 may be configured to capture audio. If an array of microphones is included, approximate distance to a sound's point of origin may be performed acoustic localization based on time and amplitude differences between sounds captured by different microphones of the array. The device 110 (using microphone 1850, wakeword detection module 220, ASR module 250, etc.) may be configured to determine audio data corresponding to detected audio data. The device 110 (using input/output device interfaces 1802, antenna 1814, etc.) may also be configured to transmit the audio data to server 120 for further processing or to process the data using internal components such as a wakeword detection module 220.

For example, via the antenna(s), the input/output device interfaces 1802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words. The ASR module 250 (or another component) may also be configured to check the ASR confidence using the techniques described above.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge exchange and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1808 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1108 and compare the captured audio to the stored models and audio sequences using audio comparison, pattern recognition, keyword spotting, audio signature, and/or other audio processing techniques.

To create output speech, the system 100 may be configured with a text-to-speech ("TTS") module (1822/1922) that transforms input text data (for example the text from command processor 290) into audio data representing speech. The audio data may then be sent to the device (110) for playback to the user, thus creating the output speech. The TTS module (1822/1922) may include a TTS storage for converting the input text into speech. The TTS module (1822/1922) may include its own controller(s)/processor(s) and memory or may use the controller/processor and memory of the server(s) 120 or other device, for example. Similarly, the instructions for operating the TTS module (1822/1922) may be located within the TTS module (1822/1922), within the memory and/or storage of the server(s) 120, or within an external device.

Text input into a TTS module (1822/1922) may be processed to perform text normalization, linguistic analysis, and linguistic prosody generation. During text normalization, the TTS module (1822/1922) processes the text input and generates standard text, converting such things as numbers, abbreviations (such as Apt., St., etc.), and symbols ($, %, etc.) into the equivalent of written out words.

During linguistic analysis the TTS module (1822/1922) analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module (1822/1922) may process speech based on phones (individual sounds), half-phones, di-phones (the last half of one phone coupled with the first half of the adjacent phone), bi-phones (two consecutive phones), syllables, words, phrases, sentences, or other units. Each word may be mapped to one or more phonetic units. Such mapping may be performed using a language dictionary stored by the system 100, for example in the TTS storage. The linguistic analysis performed by the TTS module (1822/1922) may also identify different grammatical components such as prefixes, suffixes, phrases, punctuation, syntactic boundaries, or the like. Such grammatical components may be used by the TTS module (1822/1922) to craft a natural sounding audio waveform output. The language dictionary may also include letter-to-sound rules and other tools that may be used to pronounce previously unidentified words or letter combinations that may be encountered by the TTS module (1822/1922). Generally, the more information included in the language dictionary, the higher quality the speech output.

Based on the linguistic analysis, the TTS module (1822/1922) may then perform linguistic prosody generation where the phonetic units are annotated with desired prosodic characteristics, also called acoustic features, which indicate how the desired phonetic units are to be pronounced in the eventual output speech. During this stage the TTS module (1822/1922) may consider and incorporate any prosodic annotations that accompanied the text input. Such acoustic features may include pitch, energy, duration, and the like. Application of acoustic features may be based on prosodic models available to the TTS module (1822/1922). Such prosodic models indicate how specific phonetic units are to be pronounced in certain circumstances. A prosodic model may consider, for example, a phone's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module (1822/1922), the TTS module (1822/1922) may assign more robust and complex prosodic characteristics that vary across the portion, thus making the portion sound more human, resulting in higher quality audio output.

The TTS module (1822/1922) may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module (1822/1922) may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module (1822/1922) may perform speech synthesis using one or more different methods. In one method of synthesis called unit selection, described further below, the TTS module (1822/1922) matches the symbolic linguistic representation against a database of recorded speech, such as a database of a voice corpus. The TTS module (1822/1922) matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module (1822/1922) may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module (1822/1922) to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module (1822/1922) may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

A number of techniques may be used to match speech to be synthesized with input phonetic units and/or prosodic annotations. One common technique is using Hidden Markov Models (HMMs). HMMs may be used to determine probabilities that audio output should match textual input. HMMs may be used to translate parameters from the linguistic and acoustic space to the parameters to be used by a vocoder (a digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phones and their parts (such as the phone identity, stress, accent, position, etc.). An initial determination of a probability of a potential phone may be associated with one state. As new text is processed, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency ($f_0$), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise model) based vocoders, CELP (code-excited linear prediction) vocoders, GlottHMM vocoders, HSM (harmonic/stochastic model) vocoders, or others.

The TTS module (1822/1922) may be configured to perform TTS processing in multiple languages. For each language, the TTS module (1822/1922) may include specially configured data, instructions, and/or components to synthesize speech in the desired language(s). To improve performance, the TTS module (1822/1922) may revise/update the contents of the TTS storage based on feedback of the results of TTS processing, thus enabling the TTS module (1822/1922) to improve TTS processing.

Other information may also be stored in the TTS storage for use in TTS processing. The contents of the TTS storage may be prepared for general TTS use or may be customized to include sounds and words that are likely to be used in a particular application. For example, for TTS processing by a global positioning system (GPS) device, the TTS storage may include customized speech specific to location and navigation. In certain instances the TTS storage may be customized for an individual user based on his/her individualized desired speech output. For example a user may prefer a speech output voice to be a specific gender, have a specific accent, speak at a specific speed, have a distinct emotive quality (e.g., a happy voice to correspond to a happy moment in the literary work), or other customizable characteristic. The TTS module (1822/1922) may include specialized databases or models to account for user preferences.

For example, to create the customized speech output of the system 100, the system 100 may be configured with multiple voice corpuses/unit databases, where each unit database is configured with a different "voice" to match desired speech qualities. The voice selected by the TTS module (1822/1922) to synthesize the speech may correspond to a character in the literary work. For example, one voice corpus may be stored to be used to synthesize a 1st male character's speech, another may be stored to be used to synthesize a 1st female's character, and so on. Thus the audio of each customized voice corpus matches the respective desired speech quality. The customized voice corpuses may then be used during runtime to differentiate different characters in the literary work. Additionally, parametric synthesis may be used to synthesize speech with the desired speech quality. For parametric synthesis, parametric features may be configured that match the desired speech quality. The application may also offer a user certain pre-programmed choices of types of sounds that the system 100 may provide.

The server may also include an RNN encoder 950 for encoding data into a vector form as described above. The server may also include a model training component 1970 for training or retraining various model or classifiers discussed above. Various machine learning techniques may be used to perform various steps described above, such as training/retraining an RC, entity tagger, semantic parser, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, conditional random field (CRF) classifier, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 18 and 19, are exemplary, and may be located a stand-alone device or may be included, in whole or in part, as a component of a larger device or system.

Figure 20:
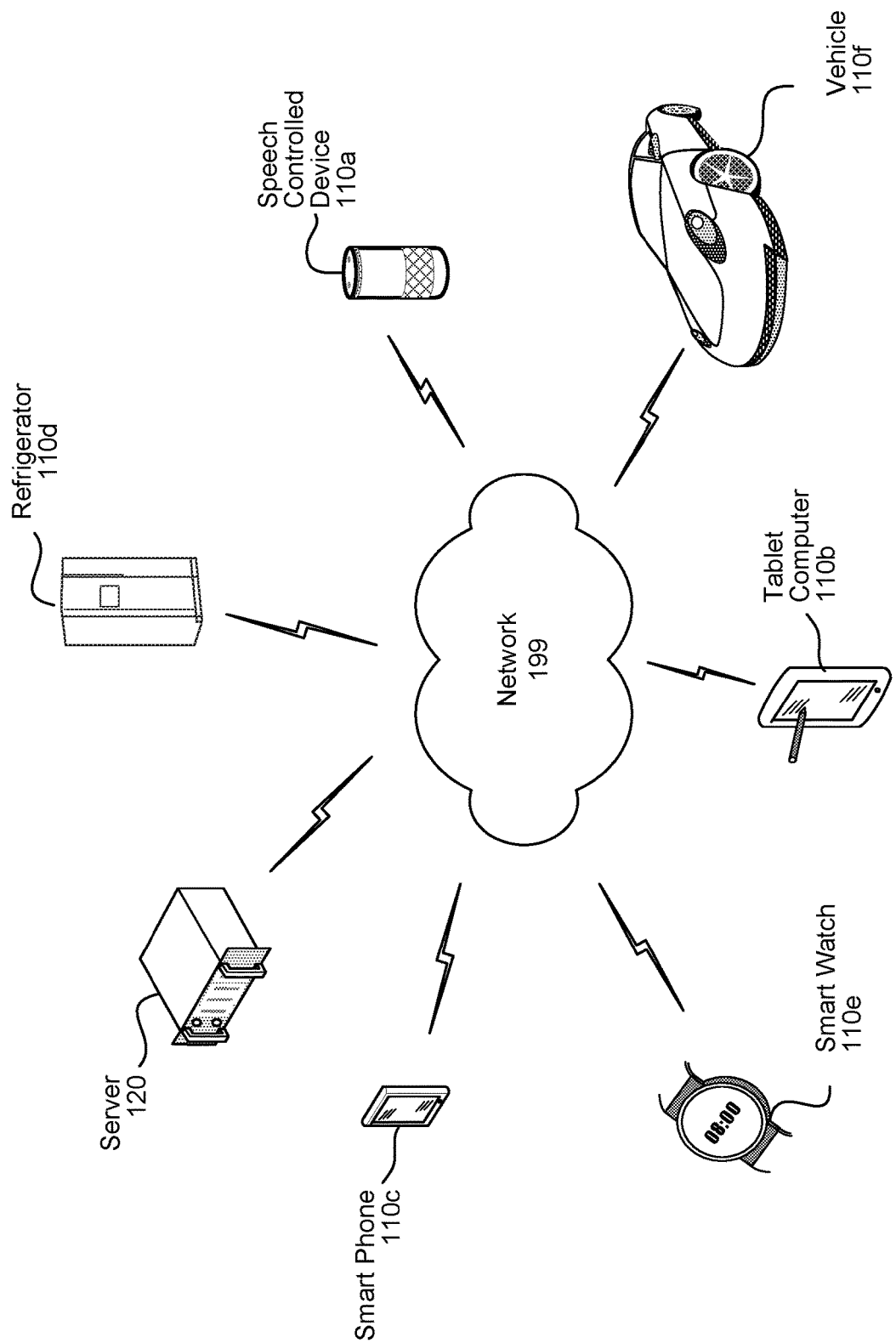
FIG. 20 illustrates an example of a computer network for use with the system.

As illustrated in FIG. 20 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1850 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   obtaining text from an internet source;
   processing a sentence of the text with a first recurrent neural network (RNN) encoder to determine a first feature vector representing characteristics of the sentence, the characteristics comprising at least an indication of words in the sentence and an order of the words in the sentence;
   processing the first feature vector using a first trained classifier to determine a first score indicating a likelihood that the sentence describes a first relation between a first name and a second name;
   determining that the first score is above a threshold;
   selecting a second trained classifier associated with the first relation;
   processing the first feature vector using the second trained classifier to determine a first text portion of the sentence that corresponds to the first name and a second text portion of the sentence that corresponds to the second name; and
   storing association data associating the first text portion, the second text portion, the first relation, and the first sentence, wherein the association data indicates that the first sentence describes the first relation between the first name and the second name.

2. The computer-implemented method of claim 1, further comprising, after storing the association data:
   storing an indication that the association was created without human intervention;
   receiving query text;
   determining that the query text includes the first name and the first relation;
   identifying the association in storage;
   identifying the indication in storage; and
   configuring answer data including the sentence and a notification that the answer data is unverified.

3. A computer-implemented method comprising:
   processing text with at least one recurrent neural network (RNN) encoder to determine a feature vector corresponding to the text;
   processing the feature vector using at least one trained classifier to determine a first result;
   determining, based at least in part on the first result, that the text describes a first relation between a first entity and a second entity;
   determining a first portion of the text that corresponds to the first entity;
   determining a second portion of the text that corresponds to the second entity; and
   storing data associating the first entity, the second entity, and the first relation.

4. The computer-implemented method of claim 3, wherein the feature vector represents characteristics of the text, the characteristics comprising at least an indication of words in the text and an order of the words in the text.

5. The computer-implemented method of claim 3, wherein:
   processing the feature vector using the at least one trained classifier determines the first result as a first score indicating a likelihood that the text describes the first relation; and
   determining that the text describes the first relation comprises determining that the first score is above a threshold.

6. The computer-implemented method of claim 5, further comprising, prior to determining that the text describes the first relation:
   processing the feature vector using a second trained classifier to determine a second score indicating a likelihood that the text describes a second relation between the first entity and the second entity; and
   determining that the second score is below the threshold.

7. The computer-implemented method of claim 3, wherein the at least one trained classifier is one of a support vector machine, a trained neural network, or a conditional random field classifier.

8. The computer-implemented method of claim 3, further comprising:
   processing second text using the at least one RNN encoder to determine a second feature vector corresponding to the second text;
   processing the second feature vector using the at least one trained classifier to determine a second result; and
   determining, based at least in part on the second result, that the second text describes a second relation between a third entity and a fourth entity.

9. The computer-implemented method of claim 3, wherein determining the first portion and the second portion comprises using a second trained classifier corresponding to the first relation to determine the first portion and the second portion.

10. The computer-implemented method of claim 3, wherein storing the data comprises storing an index entry linking the text and at least one of the first entity, the second entity, and the first relation.

11. The computer-implemented method of claim 10, further comprising, after storing the index entry:

receiving query text;

determining that the query text includes the first entity and the first relation;

identifying the index entry in storage; and configuring, based at least in part on the index entry, answer data including at least the second entity.

12. The computer-implemented method of claim 11, further comprising:

prior to receiving the query text, storing an indication that the index entry was created without human intervention; and configuring the answer data to include a notification that the answer data is unverified.

13. The computer-implemented method of claim 3, wherein:

the first result comprises an indication that the text describes the first relation; and determining that the text describes the first relation comprises determining presence of the indication.

14. A computing system comprising:

at least one processor; and memory including instructions operable to be executed by the at least one processor to configure the system to:

process text with at least one recurrent neural network (RNN) encoder to determine a feature vector corresponding to the text;

process the feature vector using at least one trained classifier to determine a first result;

determine, based at least in part on the first result, that the text describes a first relation between a first entity and a second entity;

determine a first portion of the text that corresponds to the first entity;

determine a second portion of the text that corresponds to the second entity; and store data associating the first entity, the second entity, and the first relation.

15. The computing system of claim 14, wherein the feature vector represents characteristics of the text, the characteristics comprising at least an indication of words in the text and an order of the words in the text.

16. The computing system of claim 14, wherein the memory further includes additional instructions operable to be executed by the at least one processor to further configure the system to:

use the at least one trained classifier to determine the first result as a first score indicating a likelihood that the text describes the first relation; and determine that the text describes the first relation by determining that the first score is above a threshold.

17. The computing system of claim 16, wherein the memory further includes additional instructions operable to be executed by the at least one processor to further configure the system to, prior to determining that the text describes the first relation:

process the feature vector using a second trained classifier to determine a second score indicating a likelihood that the text describes second relation between the first entity and the second entity; and determine that the second score is below the threshold.

18. The computing system of claim 14, wherein the at least one trained classifier is one of a support vector machine, a trained neural network, or a conditional random field classifier.

19. The computing system of claim 14, wherein the memory further includes additional instructions operable to be executed by the at least one processor to further configure the system to:

process second text using the at least one RNN encoder to determine a second feature vector corresponding to the second text;

process the second feature vector using the at least one trained classifier to determine a second result; and determine, based at least in part on the second result, that the second text describes a second relation between a third entity and a fourth entity.

20. The computing system of claim 14, wherein the memory further includes additional instructions operable to be executed by the at least one processor to further configure the system to:

determine the first portion and the second portion by using a second trained classifier corresponding to the first relation to determine the first portion and the second portion.

21. The computing system of claim 14, wherein the memory further includes additional instructions operable to be executed by the at least one processor to further configure the system to:

store the data by storing an index entry linking the text and at least one of the first entity, the second entity, and the first relation.

22. The computing system of claim 14, wherein the first result comprises an indication that the text describes the first relation and the memory further includes additional instructions operable to be executed by the at least one processor to further configure the system to:

determine that the text describes the first relation by determining presence of the indication.

* * * * *